(12) United States Patent
Komiya et al.

(10) Patent No.: US 7,864,068 B2
(45) Date of Patent: Jan. 4, 2011

(54) EARTHQUAKE NOTICING SERVER, EARTHQUAKE NOTICING SYSTEM, EARTHQUAKE NOTICING METHOD, AND PROGRAM

(75) Inventors: Ryosuke Komiya, Tokyo (JP); Hiroaki Kuba, Tokyo (JP); Naoki Kuwamori, Tokyo (JP)

(73) Assignee: NEC Corporation, Tokyo (JP)

( * ) Notice: Subject to any disclaimer, the term of this patent is extended or adjusted under 35 U.S.C. 154(b) by 336 days.

(21) Appl. No.: 12/182,936

(22) Filed: Jul. 30, 2008

(65) Prior Publication Data
US 2009/0033511 A1 Feb. 5, 2009

(30) Foreign Application Priority Data
Jul. 31, 2007 (JP) ............................. 2007-200087

(51) Int. Cl.
*G08B 21/00* (2006.01)
(52) U.S. Cl. ................. 340/690; 340/286.02; 702/14; 73/784
(58) Field of Classification Search ................ 340/690, 340/286.02; 702/14; 73/784
See application file for complete search history.

(56) References Cited

U.S. PATENT DOCUMENTS

| | | | | |
|---|---|---|---|---|
| 5,694,129 A | * | 12/1997 | Fujinawa et al. | ............ 340/690 |
| 5,910,763 A | * | 6/1999 | Flanagan | ................ 340/286.02 |
| 6,885,945 B2 | * | 4/2005 | Fujinawa et al. | .............. 702/15 |
| 7,035,765 B2 | * | 4/2006 | Tanahashi | ................... 702/183 |
| 7,280,920 B1 | * | 10/2007 | Whiteside et al. | ............. 702/15 |
| 7,598,884 B2 | * | 10/2009 | Lachenit et al. | ............. 340/690 |
| 2002/0103603 A1 | * | 8/2002 | Kawashima | ................. 702/15 |
| 2003/0212493 A1 | * | 11/2003 | Tanahashi | ...................... 702/5 |
| 2008/0111705 A1 | * | 5/2008 | Lee | ............................ 340/690 |

FOREIGN PATENT DOCUMENTS

JP 2005222203 A 8/2005
JP 200725962 A 2/2007

\* cited by examiner

*Primary Examiner*—Eric M Blount
(74) *Attorney, Agent, or Firm*—Sughrue Mion, PLLC

(57) ABSTRACT

In an earthquake noticing system according to the present invention, an earthquake noticing server receives focal data, calculates an expected time of arrival from a distance calculated from an occurrence location of an earthquake, a self-location and a focal depth, calculates an estimated seismic intensity from the occurrence location of the earthquake, the self-location and the seismic magnitude, calculates a corrected value of the expected time of arrival from the occurrence location of the earthquake, the self location and the location of a sub-terminal, and transmits the corrected value and estimated seismic intensity to the sub-terminal.

14 Claims, 19 Drawing Sheets

EARTHQUAKE NOTICING SERVER, EARTHQUAKE NOTICING SYSTEM, EARTHQUAKE NOTICING METHOD, AND PROGRAM

BACKGROUND OF THE INVENTION

The present invention relates to a technique for acquiring information about a focus when an earthquake occurs, and rapidly notifying earthquake announcement information such as expected time of arrival and estimated seismic intensity to various locations.

When an earthquake occurs, after the preliminary tremor (P wave, primary wave), a main shockwave (S wave, secondary wave) will occur. Although the main shockwave is generated several seconds—tens of seconds after the preliminary tremor, the damage by the earthquake is due to the large tremor of the main shockwave. For this reason, it is desirable to acquire information about the focus promptly from the preliminary tremor, and to give expected arrival data to various locations within the several seconds—several tens of seconds before the main shockwave arrives. This is because immediate steps can be taken to reduce the damage, such as extinguishing fire or hiding in a safe place under a desk, before the main shockwave arrives.

Referring to FIG. 19, we can estimate the time of arrival of the earthquake (main shockwave) from the focal depth and the distance from an object point (evaluation point) calculated from latitude/longitude, based on information about the location of the epicenter, depth and magnitude. We can also estimate and calculate the seismic intensity at the object point (evaluation point) from information about the geology of the object point, etc. By obtaining information about the focus based on the preliminary tremor, we can calculate the expected time of arrival of the earthquake and estimated seismic intensity. In recent years, a system has been provided which calculates earthquake prediction information using data such as location information and geological information, etc., for various locations when information about the focus is input.

As examples of the prior art, JP-A 2007-025962 discloses a technique which displays a time remaining until a natural disaster such as an earthquake arrives in which the plural portable information terminals receive firefighting information and Japanese Standard Time, and calculate the time remaining until the natural disaster arrives in the region. According to JP-A 2007-025962, this invention discloses a measurement terminal which detects a natural phenomenon and transmits it's information, a first data processing device which calculates a location where the natural phenomenon occurred and extracts a region which the natural phenomenon is expected to affect, and generates disaster announcement information by estimating an expected time of arrival of the natural phenomenon in the region, a second data-processing device which generates anti-disaster information for each region by classifying the disaster announcement information for each region, and transmits it, a reference radio wave station which has information showing Japan Standard Time and transmits a reference radio wave, and a portable telephone network which receives the anti-disaster information from the second data processing device, and transmits Japan Standard Time shown by the reference radio wave.

JP-A 2005-222203 discloses a technique whereby real-time earthquake information distributed by the Meteorological Agency and the like before the arrival of the main shockwave is transmitted to relevant departments at the Fire Station to reduce the damage by the earthquake. According to JP-A 2005-222203, a receiving/calculation device which can receive real-time earthquake information from the Meteorological Agency and real-time earthquake information conferences, is installed by the National Fire Prevention and Control Administration. The National Fire Prevention and Control Administration also distribute earthquake information, and this information is received by fire stations. The receiving/calculation device has a function to calculate a measured seismic intensity equivalent value and a main shockwave time of arrival, and the device installed by the National Fire Prevention and Control Administration has a simultaneous call device which issues calls to firefighting personnel. A display device, fire engines and an emergency vehicle shutter automatic open/close device are installed by the National Fire Prevention and Control Administration, as well as signaling devices for contacting anti-disaster organizations such as fire stations, city halls and regional aid teams.

According to these related art technologies, earthquake prediction information is calculated, however, it is difficult to notify the information promptly and accurately to various locations. Regarding the earthquake prediction information, it is desirable to set up as many object points as possible, and provide them with detailed information. However, the calculation load on the system becomes very large as the number of object points increases, so notification of the information may be delayed. To solve this problem, a system is desired which can calculate as accurate a value as possible while reducing the calculation load on the system.

Since there is usually only several seconds—several tens of seconds until the main shockwave arrives after a notice is issued, even if the system correctly notifies an expected time of arrival (For example, HH:MM:SS HH is hour, MM is minute SS is second) to various locations, unless a terminal which received the expected time of arrival has the correct time down to the last second, the terminal cannot know how many seconds remain before the earthquake arrives. When there is a major earthquake, the amount of communications increases, and as a result there is a communications delay. Therefore, as compared with the (x seconds remaining) calculated by the system, there is a risk that the true time remaining will have an offset due to communications delay. Hence, although the system sends information about (x seconds remaining) until arrival of the earthquake (main shockwave), there has been a technical problem in how to reproduce this accurately at the terminal which receives the notice via the communications network.

In order to solve this problem, the terminal which receives the notice calculates the time remaining and avoids communications delay. The terminal must also count the correct time down to the last second. There is a further problem how to adjust the time in case the terminal measures the time by itself. It is therefore desirable to have as many object points as possible and notify detailed earthquake information thereto without imposing an excessive load on the server and terminal calculations.

SUMMARY OF THE INVENTION

An object of the present invention is to provide an earthquake announcement server that calculates expected arrival data for an earthquake in various locations based on the focal data of the earthquake, an earthquake noticing system comprising the earthquake announcement server, earthquake announcement terminals installed at various locations that display earthquake information based on the expected arrival data received from the earthquake announcement server, a method for notifying earthquake information implemented by the earthquake announcement server, a method for notifying earthquake information implemented by the earthquake announcement server and the earthquake announcement terminals, and a program for notifying earthquake information implemented by the earthquake announcement server.

According to one aspect of the present invention, an earthquake announcement server is provided which includes:

a unit that receives focal data including the occurrence time of the earthquake, occurrence location, focal depth and magnitude of the earthquake, a unit that stores location data for the server and location data for a sub-terminal installed in the surrounding area, a unit that calculates an expected time of arrival from the occurrence location of the earthquake included in the focal data, the distance calculated from the server location and the focal depth, a unit that calculates an estimated seismic intensity from the occurrence location of the earthquake, server location, and the magnitude of the earthquake included in the focal data, a unit that calculates a value of the expected time of arrival from the occurrence location included in the focal data, the server location and the location of a sub-terminal, and a unit that transmits the value and estimated seismic intensity to the sub-terminal. The earthquake announcement server calculates expected arrival data including the expected time of arrival and estimated seismic intensity of the earthquake at the server installation point from focal data including the occurrence time of the earthquake, occurrence location, focal depth and magnitude of the earthquake, and transmits the expected arrival data to the sub-terminal installed in the surrounding area. The sub-terminal may also be provided with a unit that calculates a verified value.

According to one aspect of the present invention, an earthquake announcement server is provided which includes:

a unit that receives focal data including the earthquake occurrence time, occurrence location, focal depth and magnitude, a unit that stores the locations of earthquake announcement terminals installed in various locations, a unit that calculates an expected time of arrival from the occurrence location of the earthquake included in the focal data and the locations of the earthquake announcement terminals, a unit that calculates an expected seismic intensity based on the occurrence location of the earthquake included in the focal data, locations of the earthquake announcement terminals, and the magnitude of the earthquake, and a unit that transmits the calculated expected time of arrival, estimated seismic intensity, and information about the occurrence location of the earthquake. The server calculates the expected arrival data including the expected time of arrival and estimated seismic intensity of the earthquake at each location based on the focal data including the occurrence time of the earthquake, occurrence location, focal depth and magnitude of the earthquake, and transmits it to the earthquake announcement terminals installed at each location.

According to one aspect of the present invention, an earthquake announcement server is provided which includes:

a unit that transmits an announcement time at which the calculated expected time of arrival and an earthquake announcement is announced. The earthquake announcement server transmits the announcement time at which the earthquake announcement is announced to the earthquake announcement terminal, with the expected arrival data including the expected time of arrival and estimated seismic intensity of the earthquake at each location.

According to one aspect of the present invention, an earthquake announcement terminal is provided which includes:

a unit that receives information about an expected time of arrival, estimated seismic intensity, and occurrence location of an earthquake from the earthquake announcement server, a unit that calculates and display the time remaining until the earthquake arrives from the difference between the expected time of arrival and the current time measured at the earthquake announcement terminal, a unit that displays the received estimated seismic intensity, a unit that stores the locations of sub-terminals installed in the surrounding area, a unit that calculates a corrected value of the expected time of arrival from the occurrence location of the earthquake and the locations of the earthquake announcement terminals (either received from the earthquake announcement server, or stored in the earthquake announcement terminals), and the locations of sub-terminals, and a unit that transmits the corrected value and estimated seismic intensity to the sub-terminals. The earthquake announcement terminals are connected with the earthquake announcement server via a network, receive the expected time of arrival, estimated seismic intensity, and information about the occurrence location of the earthquake from the earthquake announcement server, and display the time remaining and estimated seismic intensity until the earthquake arrives.

According to one aspect of the present invention, an earthquake announcement terminal is provided which includes:

a unit that receives an announcement time at which the earthquake announcement was announced by the earthquake announcement server, a unit that judges whether the difference between the announcement time and the current time measured at the earthquake announcement terminal exceeds a predetermined value, and a unit that, when it does exceed the predetermined value, calculates the time remaining until the earthquake arrives based on the difference between the expected time of arrival and the announcement time. The earthquake announcement terminal checks a time offset from the difference between the current time measured by the earthquake announcement terminal and the announcement time at which the earthquake announcement was announced, and if the offset is within a predetermined time, it calculates the time remaining in the usual way.

If the offset exceeds the predetermined time, the announcement time is substituted for the current time to calculate the time remaining. The earthquake announcement terminal, if it does not exceed the predetermined value, calculates and displays the time remaining until the earthquake arrives from the difference between the expected time of arrival and the current time measured by the earthquake announcement terminal. The time in case the current time measured by the earthquake announcement terminal has an offset is not limited to the announcement time at which the earthquake announcement was announced, and may for example be the time at which the expected time of arrival and estimated seismic intensity were generated at the earthquake announcement server, or the time at which the expected time of arrival and estimated seismic intensity were issued by the earthquake announcement server.

BRIEF DESCRIPTION OF THE DRAWINGS

Other features and advantages of the invention will be made more apparent by the following detailed description and the accompanying drawings, in which.

In the drawings, the same reference numerals represent the same structural elements.

DETAILED DESCRIPTION OF THE PREFERRED EMBODIMENTS

A first embodiment of the present invention will be described in detail below.

Figure 1:
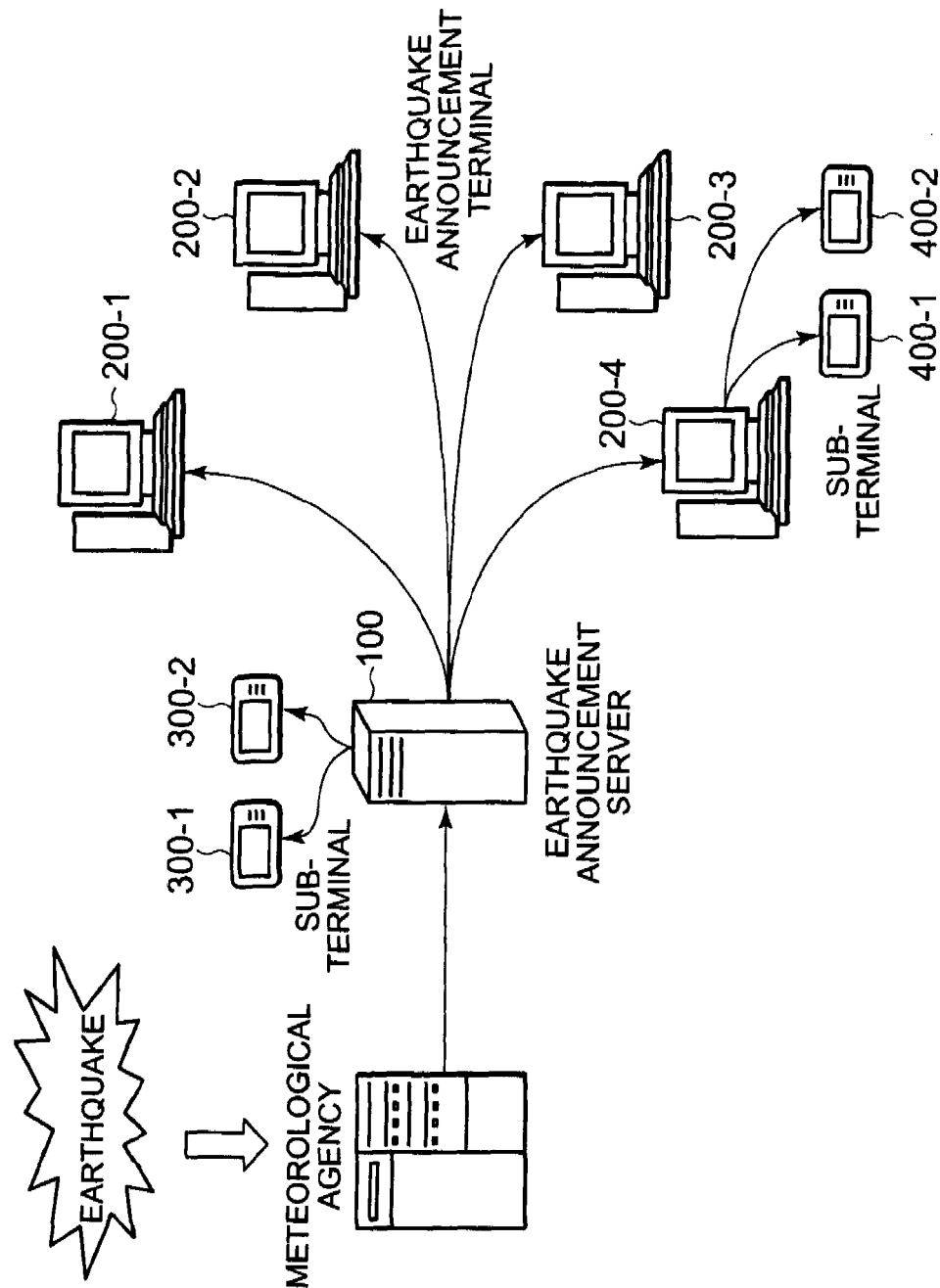
FIG. 1 is a diagram showing the configuration of an earthquake noticing system according to this embodiment.

The earthquake prediction noticing system according to the present invention includes, as shown in FIG. 1, an earthquake announcement server 100 which acquires focal data for an earthquake measured by the Meteorological Agency, and calculates the expected arrival data of the earthquake at various locations, and earthquake announcement terminals 200 installed at various locations which receive the expected arrival data from the earthquake announcement server 100, and display earthquake prediction information from the data. The earthquake announcement server 100 receives data from the Meteorological Agency (specifically, focal data distributed by the Meteorological Affairs Assistance Center etc.) via a common carrier leased line etc.

The communication network between the earthquake announcement server 100 and earthquake announcement terminal 200 is not particularly limited, but it is preferred to use a network which does not easily produce a communication delay like an company network. The earthquake announcement server 100 and earthquake announcement terminal 200 also notify earthquake prediction information to sub-terminals 300 (400) further installed in the surrounding areas.

Figure 2:
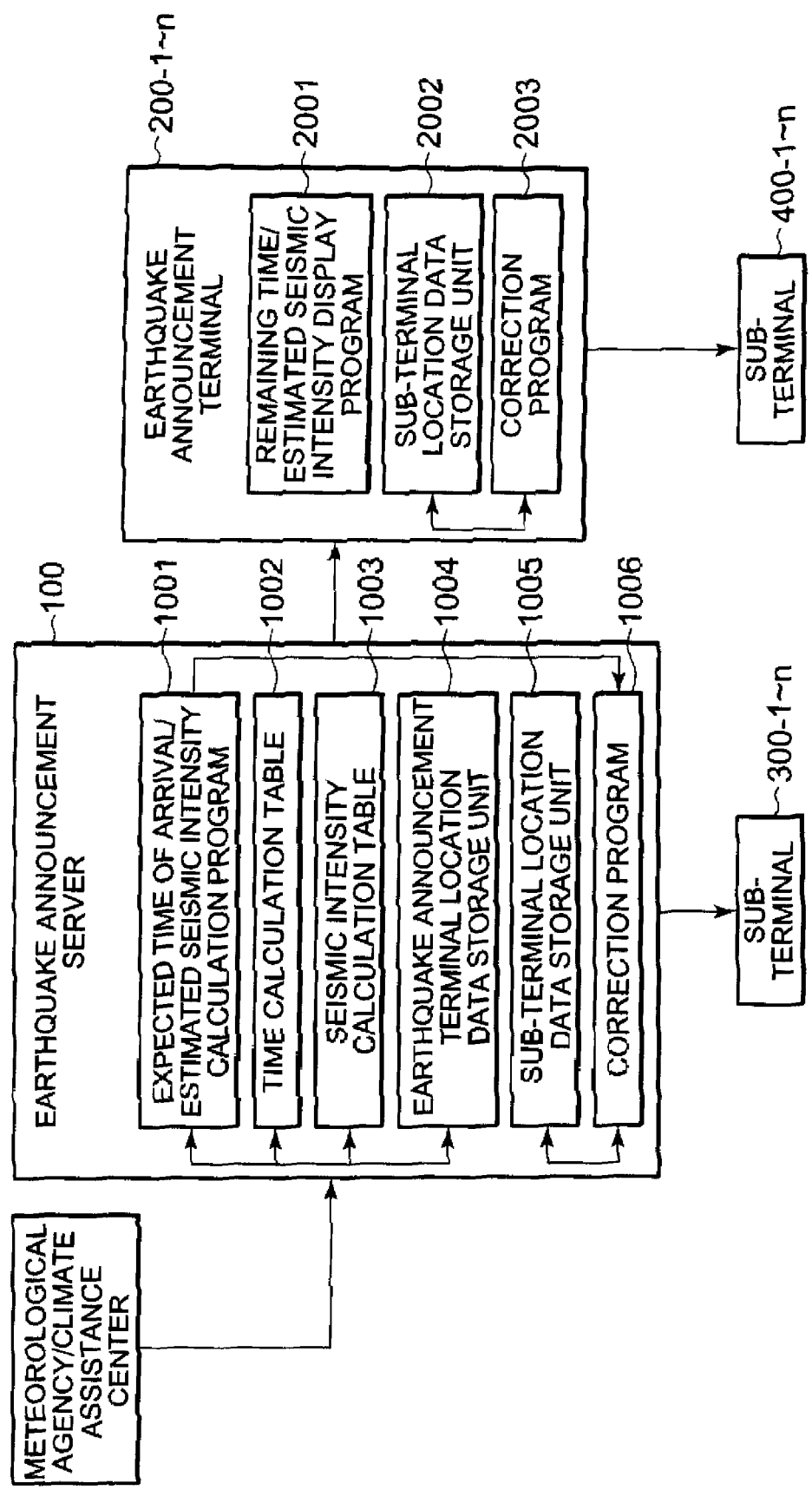
FIG. 2 is a diagram showing the function of each device according to this embodiment.

The earthquake announcement server (100) and earthquake announcement terminal (200) are computers respectively having a communication function, and comprise a CPU, main memory and HDD. FIG. 2 show the earthquake announcement server 100 comprising at least an expected time of arrival/estimated seismic intensity calculation program 1001, correction program 1006, time computation table 1002, seismic computation table 1003, earthquake announcement terminal location data storage unit 1004, and sub-terminal location data storage unit 1005. The expected time of arrival/estimated seismic intensity calculation program 1001 is a program for calculating expected arrival data for the earthquake at various locations including the location where the server is installed. It is read from the HDD of the earthquake announcement server 100 into the main memory, data processing being performed by the CPU. The correction program 1006 is a program which performs calculation to correct the expected arrival data for the earthquake in the area surrounding the server based on the expected arrival data of the earthquake at the location where the server is installed, calculated by the expected time of arrival/estimated seismic intensity calculation program 1001. This program is read from the HDD of earthquake announcement server 100 into the main memory, data processing being performed by CPU. Predetermined storage areas of the HDD or main memory are assigned to the time computation table 1002, seismic computation table 1003, earthquake announcement terminal location data storage unit 1004, and sub-terminal location data storage unit 1005, respectively. The earthquake announcement terminal 200 comprises at least a time remaining/estimated seismic intensity display program 2001, correction program 2003, and sub-terminal location data storage unit 2002. The time remaining/estimated seismic intensity display program 2001 is a program for displaying the earthquake prediction information included in the expected arrival data received from the earthquake announcement server 100. This program is read from the HDD of the earthquake announcement terminal 200 into the main memory, data processing being performed by the CPU. The correction program 2003 is a program which performs calculation to correct the expected arrival data of the earthquake in the area surrounding the earthquake announcement terminal 200. This program is read from the HDD of the earthquake announcement terminal 200 into the main memory, data processing being performed by the CPU. The sub-terminal comprises location data storage unit 2002 that is assigned to predetermined storage areas of the HDD or main memory. The sub-terminal 300 (400) is a terminal comprising a communications unit that receives earthquake prediction information transmitted from the earthquake announcement server 100 or earthquake announcement terminal 200, and a unit that displays information on a display unit. Instead of displaying on the display unit, the sub-terminal 300 (400) may show earthquake prediction information for example by a visual effect (flashing, or a other patterns), or may output earthquake prediction information by voice.

Figure 3:
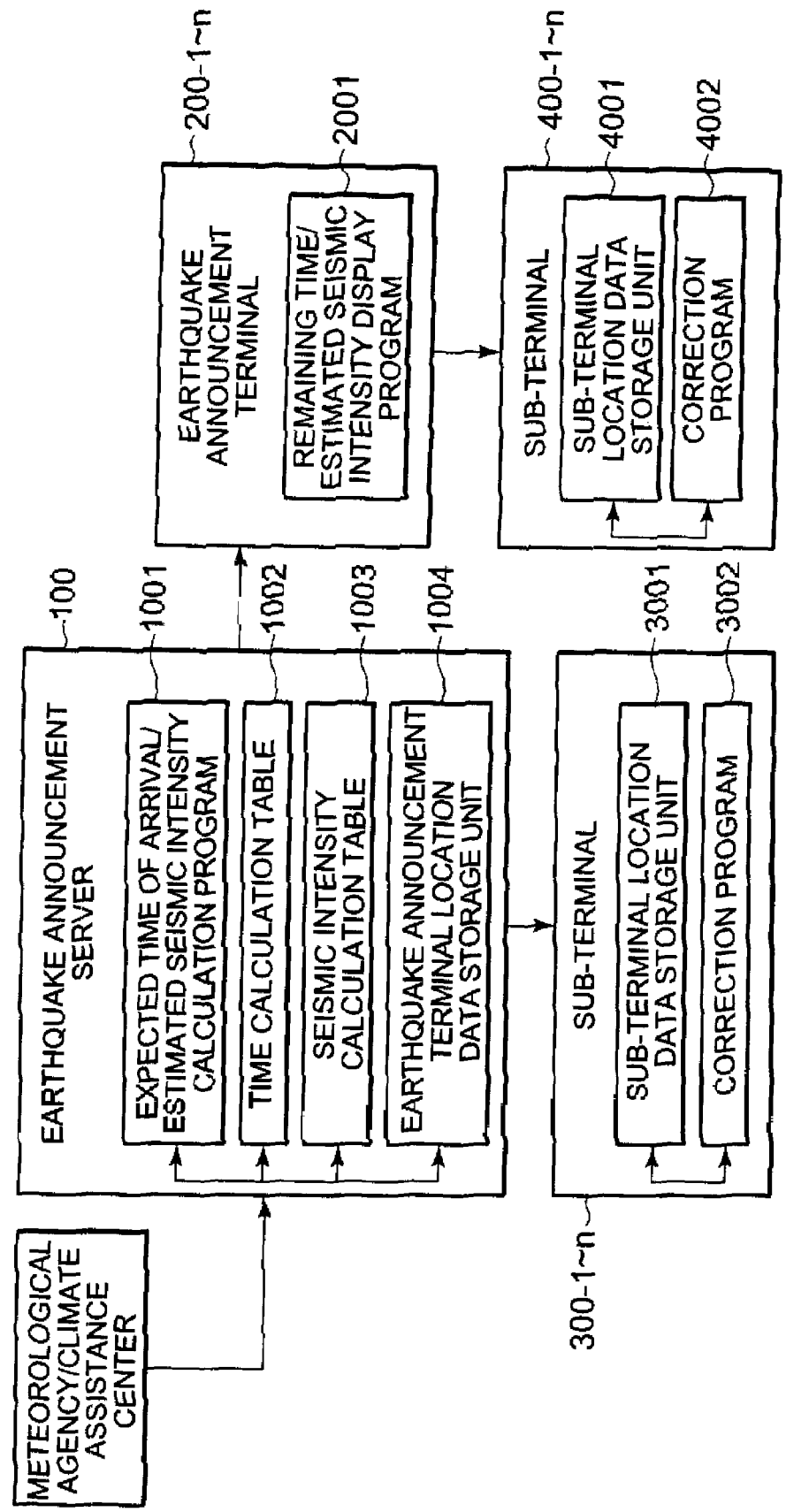
FIG. 3 is a diagram showing the function of each device according to another aspect of this embodiment.

In FIG. 2, the earthquake announcement server 100 and earthquake announcement terminal 200 calculate a corrected value for the sub-terminal 300 (400), and in FIG. 3, the sub-terminal 300 (400) calculates a corrected value for the sub-terminal 300 (400). In this case, the sub-terminal 300 (400) is a computer having a communications unit, and is further provided with a CPU, main memory, and HDD. The sub-terminal 300 (400) comprises at least a correction program 3002 (4002) and a sub-terminal location data storage unit 3001 (4001). The sub-terminals 300 surrounding the earthquake announcement server 100 may store location data for the earthquake announcement server 100, or the sub-terminals 400 surrounding the earthquake announcement terminal 200 may store location data for each earthquake announcement terminal.

According to this embodiment, the earthquake announcement server 100 is installed in the head office of a company, etc., and the earthquake announcement terminal 200 is installed in a branch office or business location. In this case, the system can notify earthquake prediction information to the company promptly by connecting these via a company network. This system may be installed in public institutions, such as the police, fire stations, and schools. A service provider who provides earthquake prediction information may also introduce the earthquake announcement server 100, and install the earthquake announcement terminal 200 in a client company to provide the service. The earthquake announcement server 100 and earthquake announcement terminal 200 may be simply represented as apparatuses. The earthquake announcement server 100 may be simply represented as a server. The earthquake announcement terminal 200 and sub-terminal 300 (400) may be simply represented as terminals.

Figure 4:
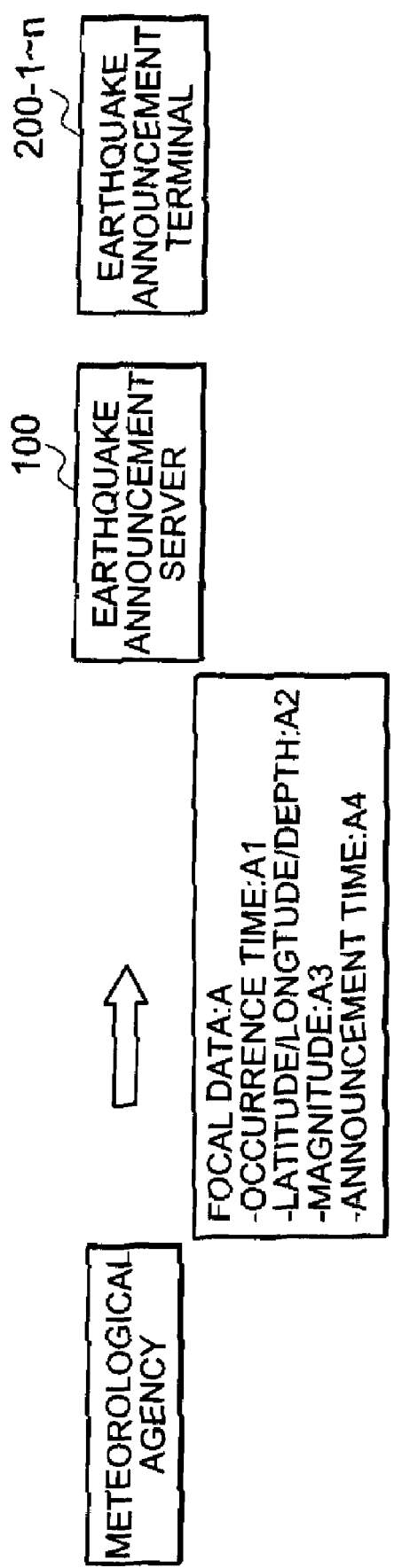
FIG. 4 is a diagram showing focal data received by an earthquake announcement server according to this embodiment.

Hereafter, this embodiment will be described referring to FIGS. 4-18. First, FIGS. 4-9 show the flow whereby a apparatus displays earthquake prediction information. The earthquake announcement server 100 calculates expected arrival data for an earthquake at each location where the earthquake announcement server 100 and earthquake announcement terminal 200 are installed, and the apparatus displays earthquake prediction information. Next, FIGS. 10-18 show an embodiment that the sub-terminal 300 (400) displays the earthquake prediction information corrected by expected arrival data, The Meteorological Agency observes information such as focal data at the time when an earthquake occurs. The Meteorological Agency provides information via information-providing organizations, such as the Meteorological Affairs Assistance Center. As shown in FIG. 4, the earthquake announcement server 100 receives focal data: A from these organizations via the network. The focal data includes at least information about the occurrence time: A1 of the earthquake, latitude, longitude, and depth (location of the focus): A2 of the focus, magnitude (seismic magnitude): A3, and the announcement time: A4 at which the earthquake announcement was announced by the Meteorological Agency.

Figure 5:
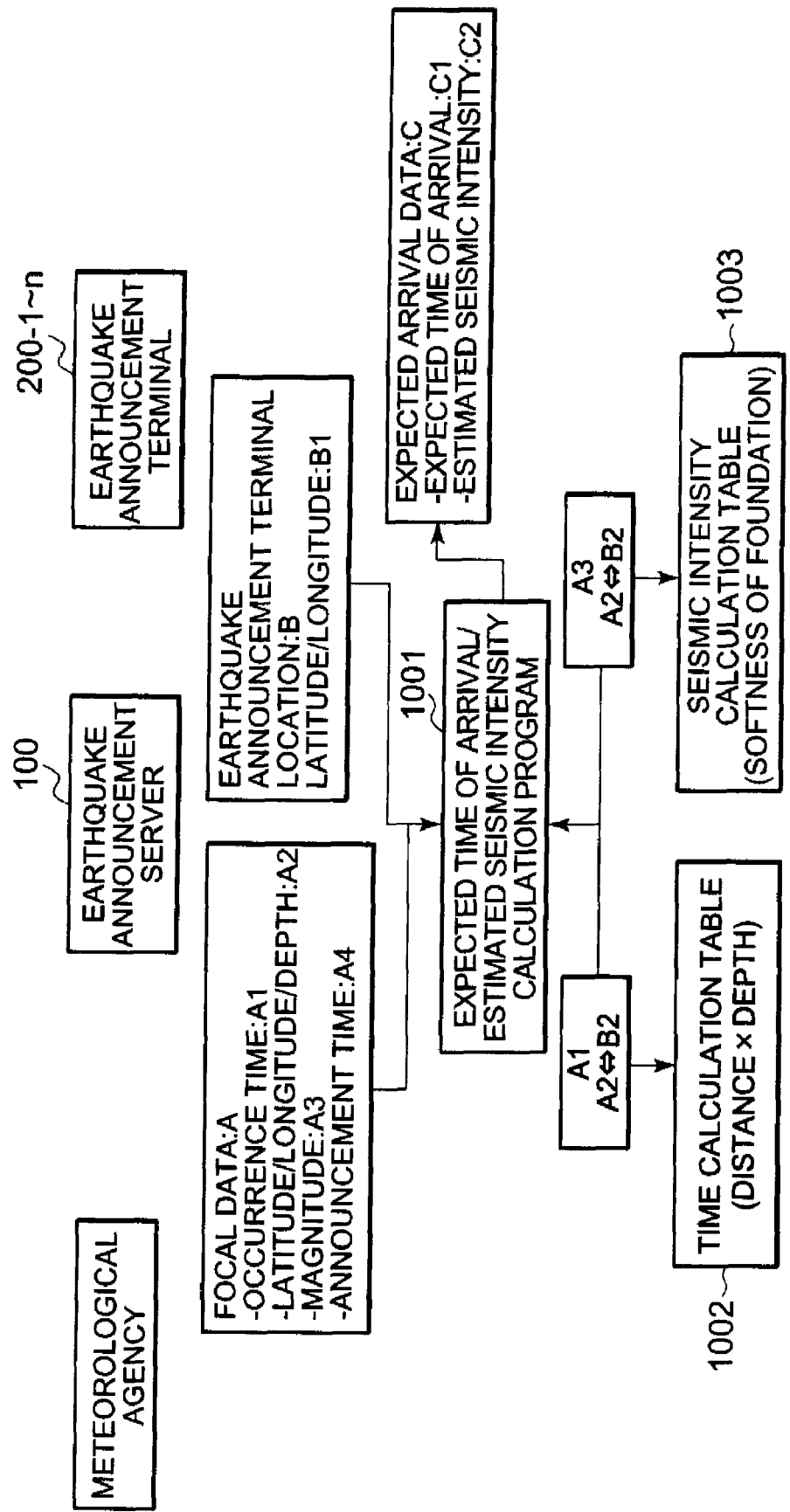
FIG. 5 is a diagram showing generation of earthquake expected arrival data according to this embodiment.

The earthquake announcement server 100, when it receives the focal data: A, starts the expected time of arrival/estimated seismic intensity calculation program 1001. As shown in FIG. 5, the program generates expected arrival data (C) for the earthquake at each location where the earthquake announcement server 100 and earthquake announcement terminal 200 are installed.

Figure 6:
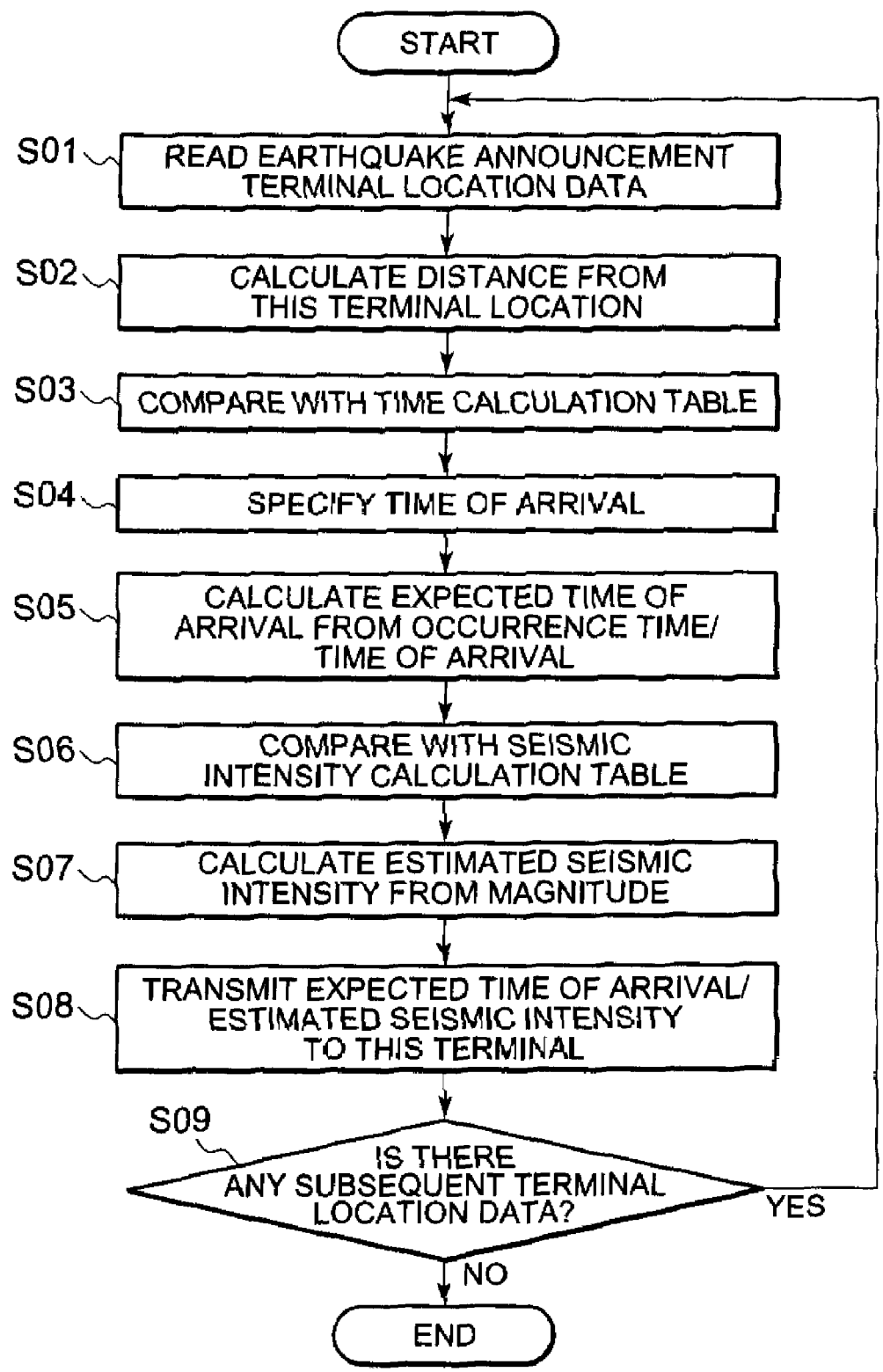
FIG. 6 is a flow chart for the purpose of generating the earthquake expected arrival data according to this embodiment.

First, the program reads an earthquake announcement terminal location (B) of a certain point where the earthquake announcement server 100 and earthquake announcement terminal 200 are installed, from the earthquake announcement terminal location data storage unit 1004. The earthquake announcement terminal location data includes the latitude and longitude: B1 of the locations where the earthquake announcement server 100 and earthquake announcement terminal 200 are installed. The program calculates the distance from the focus to the point where the earthquake announcement server 100 and earthquake announcement terminal 200 are installed based on the earthquake announcement terminal locations and the focal latitude/longitude (part of A2) included in the focal data. On the other hand, the time computation table 1002 has information about the estimated time of arrival of the earthquake based on the distance from the focus, and the depth of the focus (this table may be a table generally used for earthquake prediction). The program can specify the time of arrival to the point at which the earthquake announcement server 100 and earthquake announcement terminal 200 are installed from the calculated distance and focal depth (part of A2) included in the focal data. The program can calculate an expected time of arrival (C1) of the earthquake at the point where the earthquake announcement server 100 and earthquake announcement terminal 200 are installed by adding the specified expected time to the occurrence time (A1) included in the focal data. The seismic computation table 1003 defines the degree of the earthquake transmitted to a certain point according to the distance from the focus, from the relation with the geology (softness of the foundation) (this table may be a table generally used for earthquake prediction). For example, the seismic intensity calculated from the distance between the location of a terminal which is an evaluation point and the focus, and the magnitude, is multiplied by a foundation amplification factor based on an attenuation table. The program can specify an estimated seismic intensity (C2) at the points at which the earthquake announcement server 100 and earthquake announcement terminal 200 are installed based on the earthquake announcement terminal location (B) and the focal latitude/longitude (part of A2) included in the focal data. The FIG. 6 shows flow chart which generates the expected arrival data for the earthquake at each location where the earthquake announcement server 100 and earthquake announcement terminal 200 shown in FIG. 5 are installed. In the earthquake announcement server 100, the expected time of arrival/estimated seismic intensity calculation program 1001 repeats the processing which generates the earthquake expected arrival data (C) for each location where the earthquake announcement server 100 and earthquake announcement terminal 200 are installed.

Figure 7:
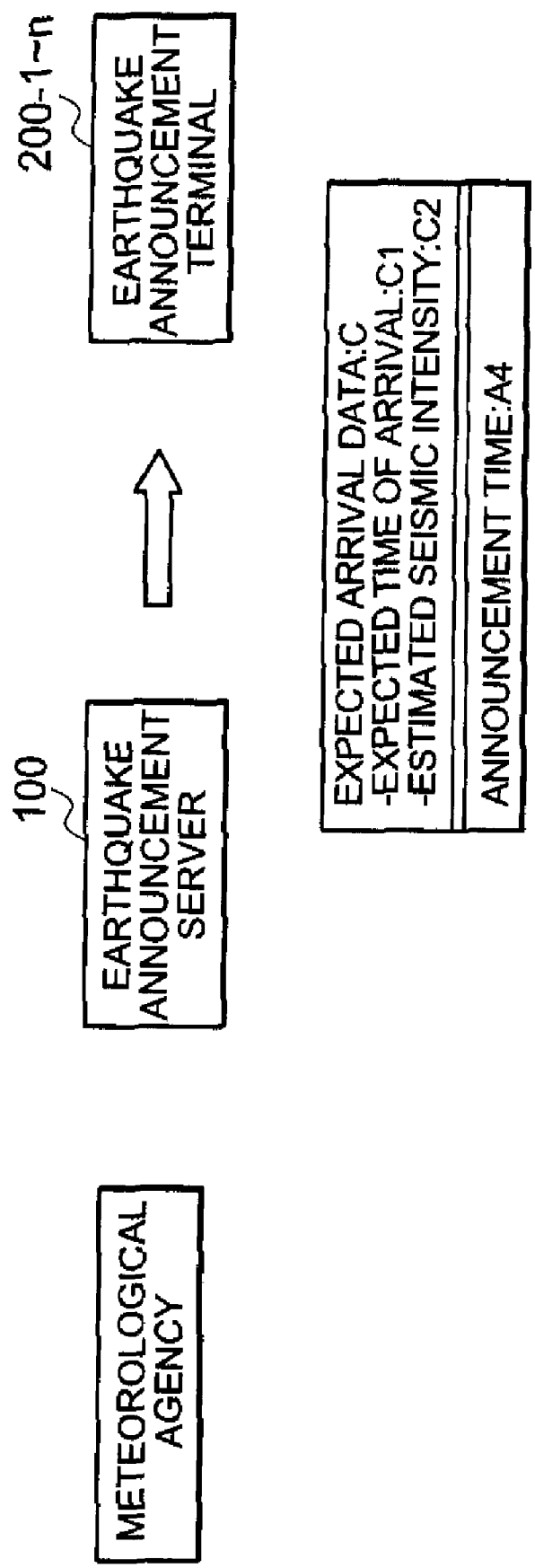
FIG. 7 is a diagram showing the expected arrival data for an earthquake received by an earthquake announcement terminal according to this embodiment.

As shown in FIG. 7, the earthquake announcement server 100 transmits the earthquake expected arrival data (C) at each location where the earthquake announcement terminal 200 are installed generated by the earthquake announcement server 100, to each earthquake announcement terminal 200. At this time, the earthquake announcement server 100 transmits focal latitude/longitude data (part of A2) included in the focal data together with the announcement time (A4) at which the earthquake announcement was announced by the Meteorological Agency, to the earthquake announcement terminal 200.

Figure 8:
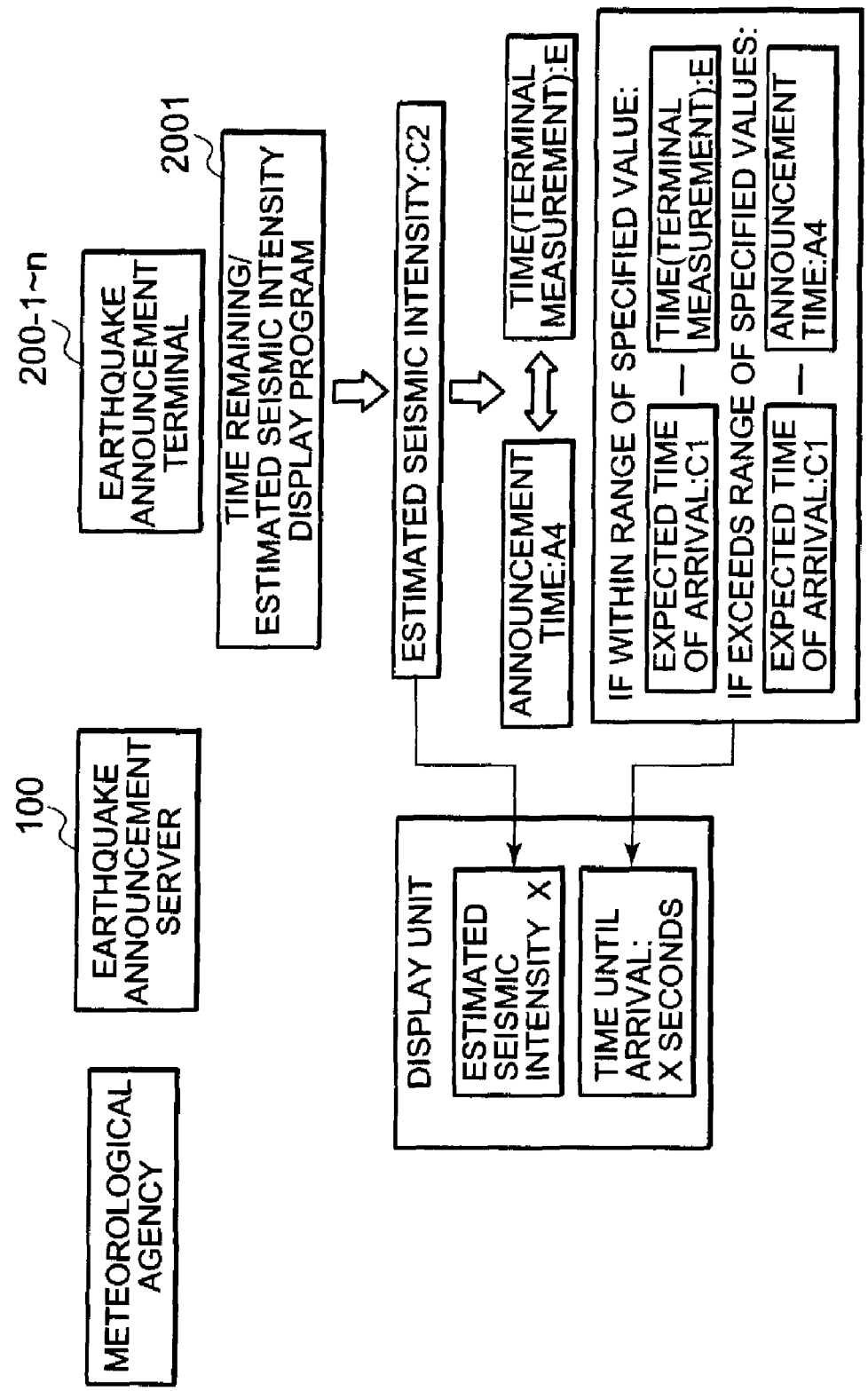
FIG. 8 is a diagram showing the time remaining until the earthquake arrives at the earthquake announcement terminal according to this embodiment.

When the earthquake announcement terminal 200 receives the expected arrival data (C) and the announcement time (A4), as shown in FIG. 8, it starts the time remaining/estimated seismic intensity display program 2001. The program displays the time remaining to earthquake arrival and the estimated seismic intensity on the display unit of the earthquake announcement terminal 200. First; the program displays the estimated seismic intensity (C2) included in the expected arrival data in a display column of the display unit for displaying the estimated seismic intensity at the point where the earthquake announcement terminal 200 is installed. For example, the program displays an (estimated seismic intensity x) in the display column. The program also calculates the time remaining to arrival from a difference from the time measured at the earthquake announcement terminal 200. In this case, the program, to determine the accuracy of the clock provided to the earthquake announcement terminal 200, calculates the difference between the announcement time (A4) received from the earthquake announcement server 100 and the time (E) measured at the earthquake announcement terminal 200. The program determines whether the difference exceeds a specified value (permitted number of seconds error is set). The program, when it does not exceed the specified value, determines that the clock with which the earthquake announcement terminal 200 is provided, is accurate. The program then calculates a difference obtained by subtracting the time (E) measured at the terminal from the expected time of arrival (C1) received from the earthquake announcement server 100, and takes the difference as the time remaining to arrival. The program also displays the time remaining to arrival at the point where the earthquake announcement terminal 200 is installed, in a display column. For example, the program displays this information in the form of (X seconds until arrival). The program, when the specified value is exceeded, determines that the clock with which the earthquake announcement terminal 200 is provided, has a time offset. The program then calculates a difference obtained by subtracting the announcement time (A4) received from the earthquake announcement server 100 from the expected time of arrival (C1) received from the earthquake announcement server 100, and takes the difference as the time remaining to arrival. The program also displays the time remaining to arrival where the earthquake announcement terminal 200 is installed, in a display column. For example, the program displays this information in the form of (X seconds until arrival).

Figure 9:
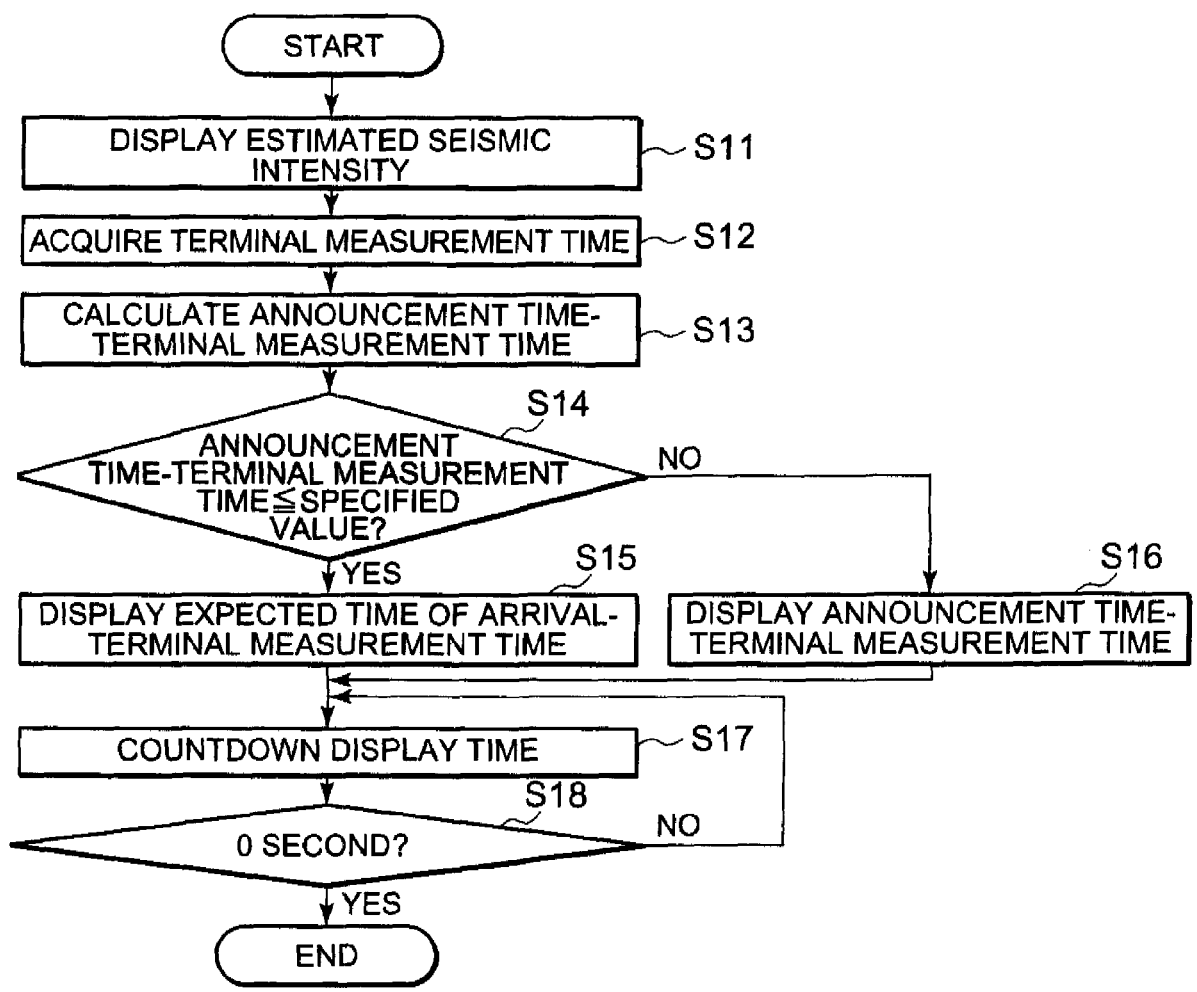
FIG. 9 is a flow chart displaying earthquake prediction information according to this embodiment.

The display time is counted every second according to the clock with which the earthquake announcement terminal 200 is provided, and this time is counted down until the display is 0 seconds. The FIG. 9 show the flow chart that displays the estimated earthquake information for each location at which the earthquake announcement terminal 200 is installed.

The announcement time (A4) at which the earthquake announcement was issued, may be replaced. For example, the time at which the expected time of arrival and estimated seismic intensity were generated at the earthquake announcement server 100, or the time at which the expected time of arrival and estimated seismic intensity were issued by the earthquake announcement server 100, may replace the announcement time.

Figure 10:
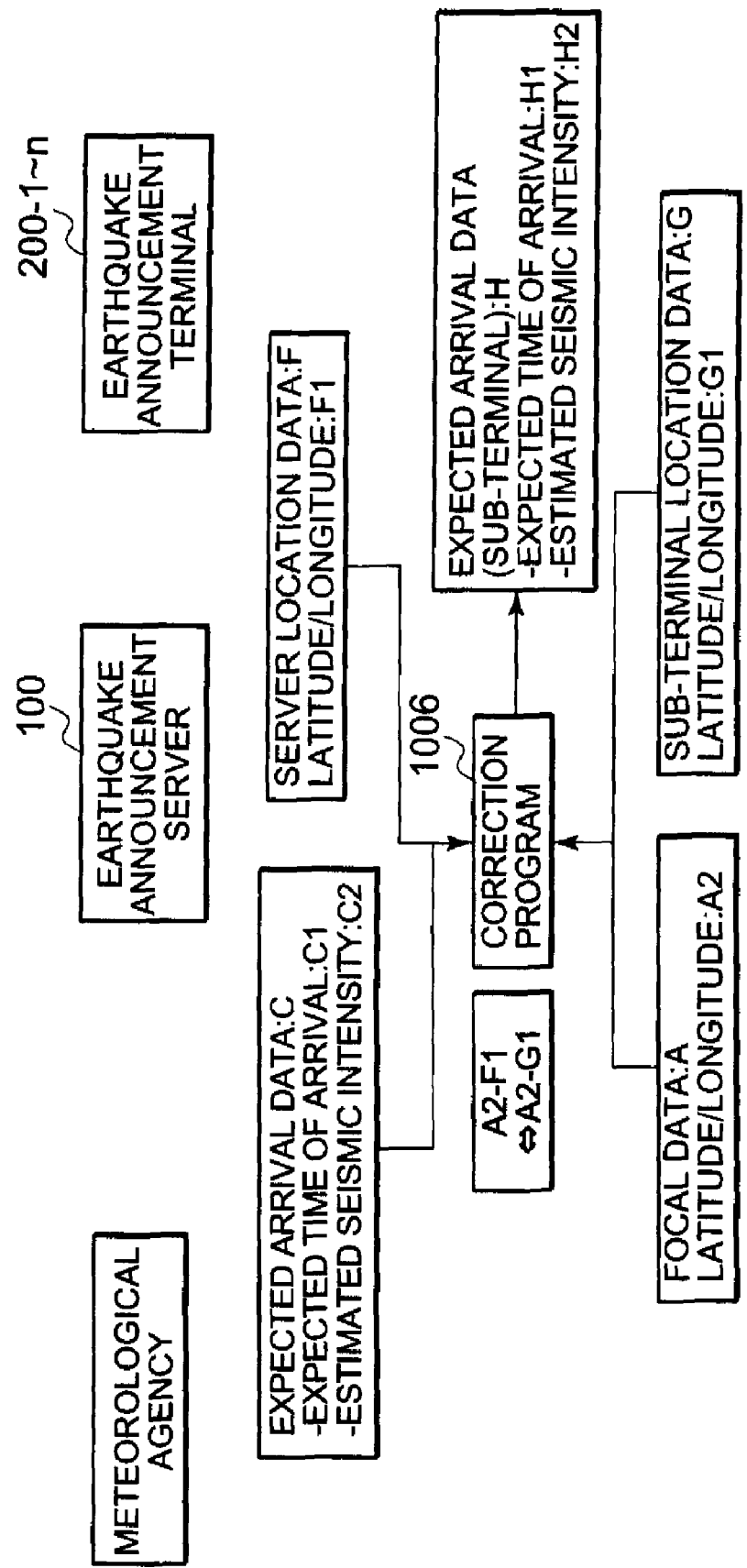
FIG. 10 is a diagram showing transmission of earthquake prediction data to a sub-terminal in the area surrounding the earthquake announcement server according to this embodiment.
Figure 11:
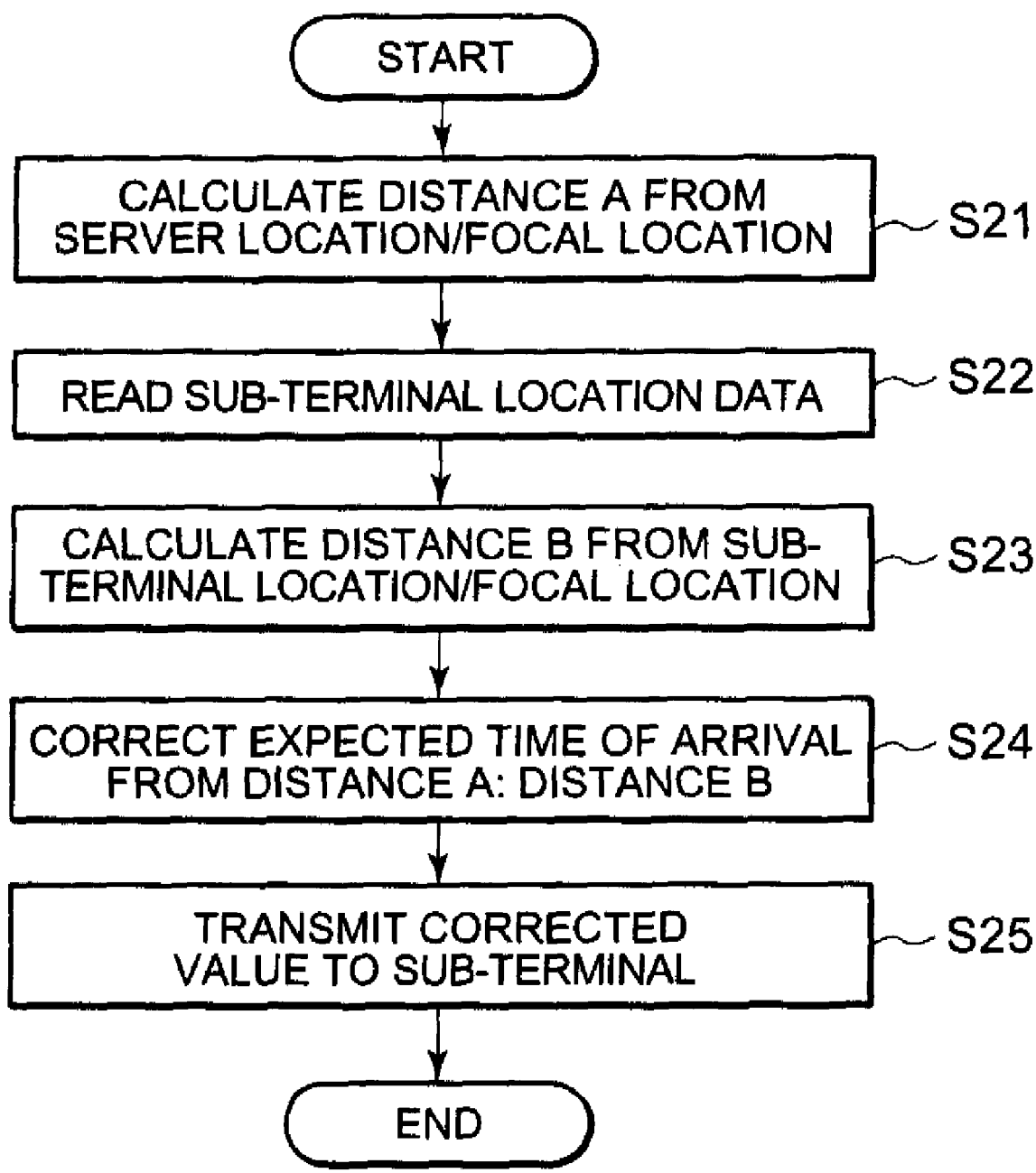
FIG. 11 is a flow chart whereby the earthquake expected arrival data according to this embodiment is corrected, and the corrected value is transmitted to a sub-terminal.
Figure 12:
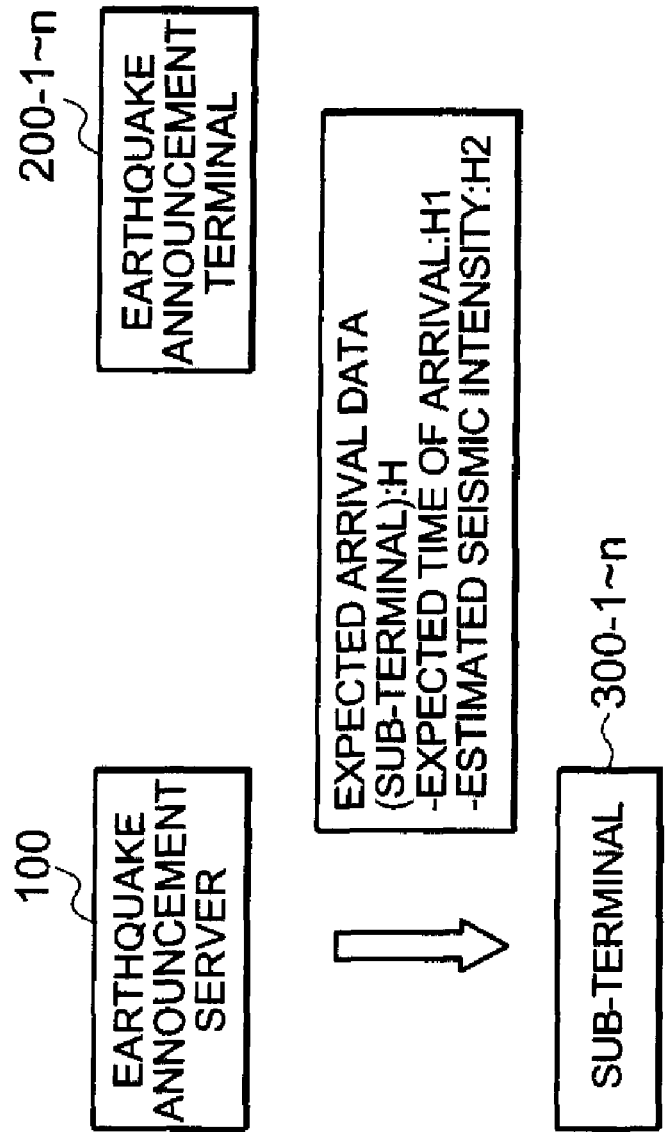
FIG. 12 is a diagram showing the corrected expected arrival data transmitted to the sub-terminal according to this embodiment.

FIGS. 10-12 show a pattern for transmitting data in which the earthquake expected arrival data is corrected. In this embodiment, the earthquake announcement server 100 transmits data in which the earthquake expected arrival data is corrected for a point at which the earthquake announcement server 100 was installed, to the sub-terminal 300 installed in an area surrounding the earthquake announcement server 100. FIG. 2 shows the constitution of the earthquake announcement server 100. The earthquake announcement server 100 generates the expected arrival data (C) at the point where the earthquake announcement server 100 is installed. Next, as shown in FIG. 10, the earthquake announcement server 100 starts the correction program 1006, and generates expected arrival data (H) at the sub-terminal 300 whereby the expected arrival data (C) at the point where the earthquake announcement server 100 is installed, is corrected. First, the program reads sub-terminal location data (G) for a certain point where the sub-terminal 300 is installed from the sub-terminal location data storage unit 1005. The sub-terminal location data includes the latitude and longitude of the point where the sub-terminal 300 was installed. Next, the program calculates the distance between the earthquake announcement server 100 and the focus based on server location data (F) at the point where the earthquake announcement server 100 used for generating the expected arrival data (C) is installed, and the focal latitude and longitude (part of A2) included in the focal data. The program also calculates the distance between the sub-terminal 300 and the focus based on the sub-terminal location data (G), and the focal latitude/longitude (part of A2) included in the focal data. The program corrects the expected time of arrival (C1) using the ratio of these distances. The correction method is not particularly limited, but in order to reduce the data processing load, it is preferred to use a simple method, such as to adjust the expected time of arrival (C1) by 1%, if the distance between the sub-terminal 300 and the focus is shorter than the distance between the earthquake announcement server 100 and the focus by 1%. Since a detailed calculation is performed for the point where the earthquake announcement server 100 is installed, and the correction is limited to points in the surrounding area, this has little adverse effect. Specifically, the program can calculate a numerical value close to the exact value without increasing the data processing load excessively. On the other hand, regarding the estimated seismic intensity (C2), if there is no suitable simple correction method, the existing value is used without modification. FIG. 11 shows the flow chart which corrects the expected arrival data for the earthquake at the point where the earthquake announcement server 100 shown in FIG. 10 is installed, and transmits the corrected value to the sub-terminal 300. As shown in FIG. 12, the earthquake announcement server 100 transmits the corrected expected arrival data (H) to the sub-terminal 300. The sub-terminal 300 may display the expected arrival data (H) as it is, and by installing the time remaining/estimated seismic intensity display program 2001 in the sub-terminal 300 in the same way as for the earthquake announcement terminal 200 as described earlier, the time remaining can be displayed on the display unit by a countdown.

Figure 13:
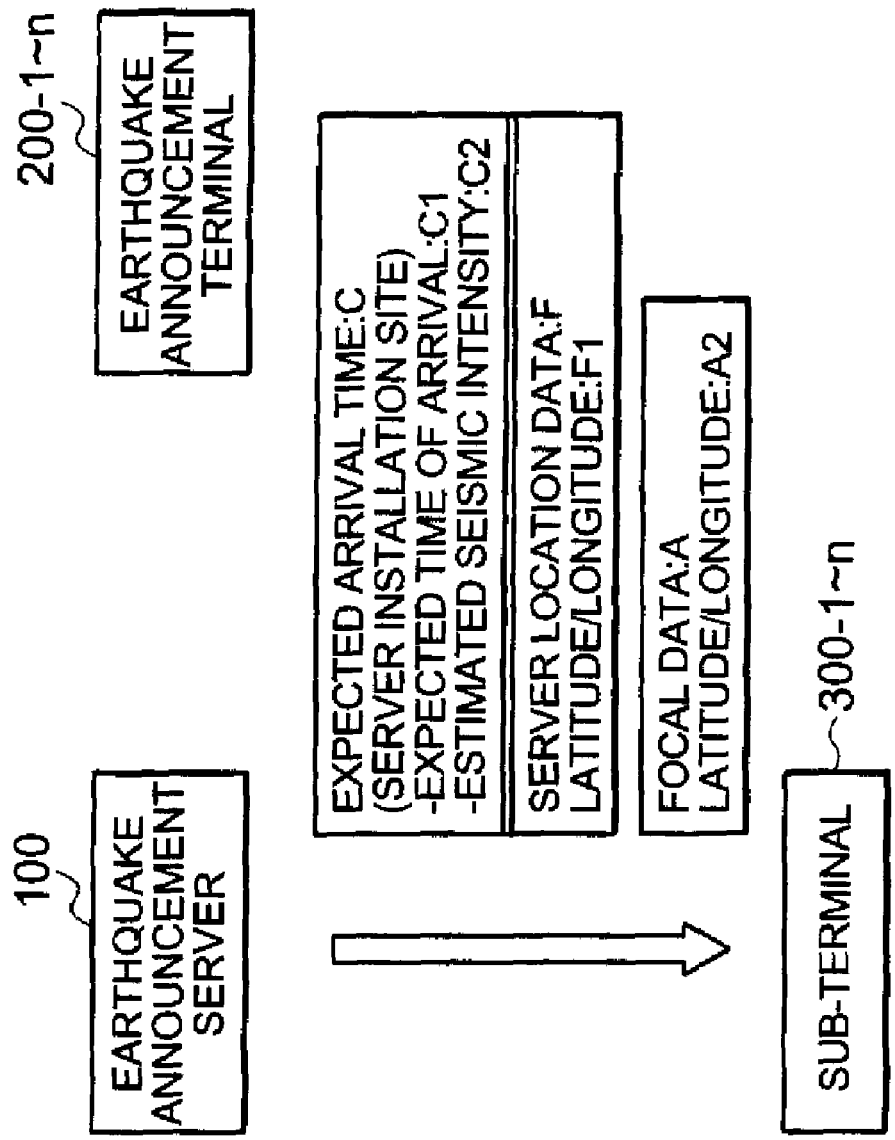
FIG. 13 is a diagram showing transmission of the earthquake expected arrival data to the sub-terminal in the area surrounding the earthquake announcement server according to this embodiment, and corrected earthquake prediction data at the sub-terminal.
Figure 14:
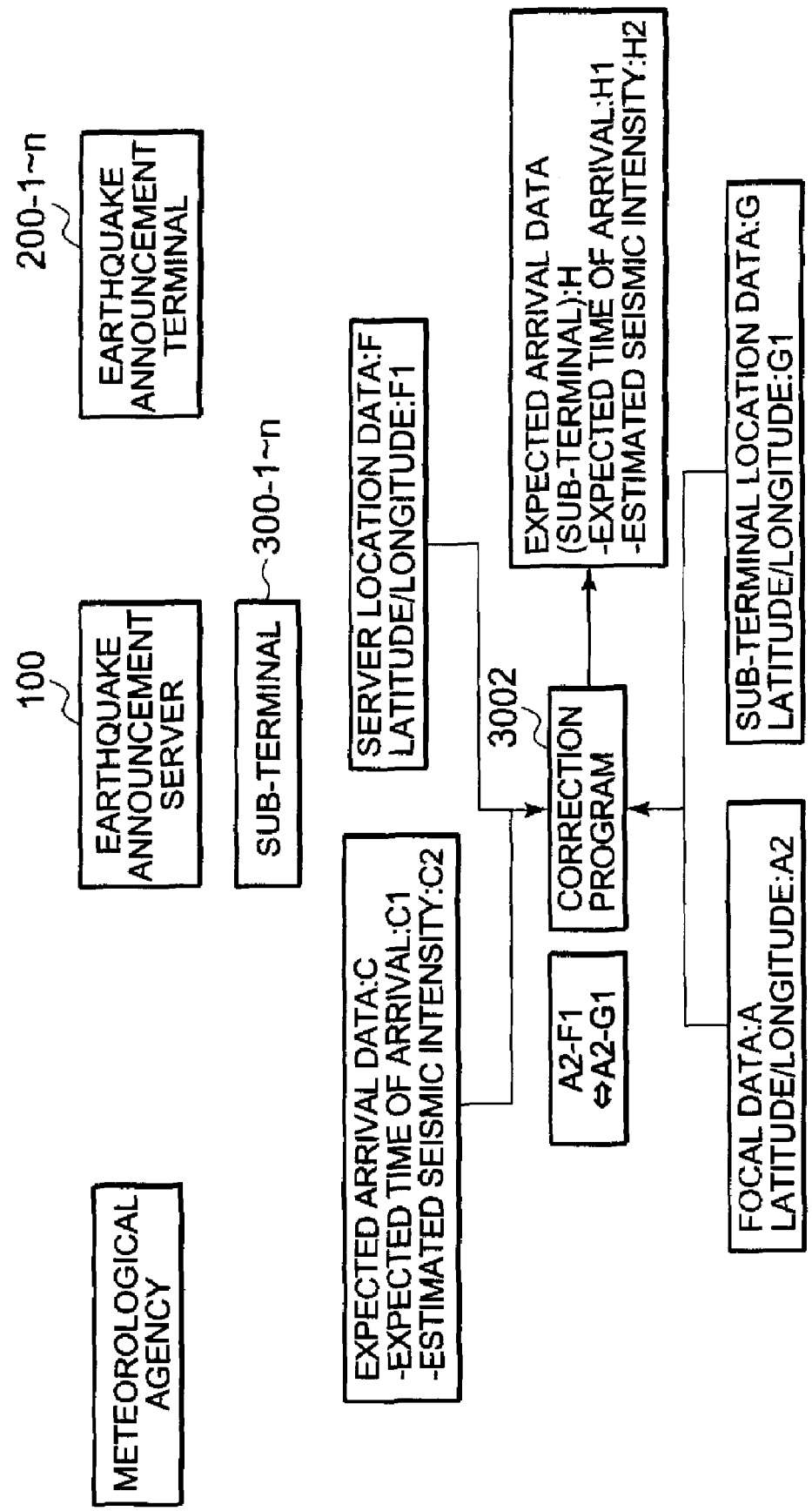
FIG. 14 is a diagram showing the expected arrival data at a sub-terminal at which the expected arrival data according to this embodiment was corrected.

FIGS. 13-14 show a pattern which generates the corrected earthquake prediction information on the sub-terminal 300.

Specifically, the earthquake announcement server 100 transmits the earthquake expected arrival data at the point where the earthquake announcement server 100 is installed, to the sub-terminal 300 installed in the area surrounding the earthquake announcement server 100. The earthquake announcement server 100 and sub-terminal 300 are constituted as shown in FIG. 3.

As shown in FIG. 13, the earthquake announcement server 100 transmits the expected arrival data (C) for the point where the earthquake announcement server 100 is installed, the server location data (F) for the point where the earthquake announcement server 100 is installed, and the focal latitude/longitude (part of A2) included in the focal data, to the sub-terminal 300.

The sub-terminal 300 receives these data, and as shown in FIG. 14, it starts the correction program 3002. The program generates the expected arrival data (H) at the sub-terminal 300 which corrects the expected arrival data (C) at the point where the earthquake announcement server 100 is installed. First, the program reads the sub-terminal location data (G) at the point where the sub-terminal 300 is installed from the sub-terminal location data storage unit 3001. The sub-terminal location data includes the latitude and longitude of the point where the sub-terminal 300 is installed. The program calculates the distance between the earthquake announcement server 100 and the focus from the server location data (F) received from the earthquake announcement server 100, and the focal latitude/longitude (part of A2) included in the focal data. The program also calculates the distance between the sub-terminal 300 and the focus from the read sub-terminal location data (G) and the focal latitude/longitude (part of A2) included in the focal data. The program corrects the expected time of arrival (C1) using the ratio of these distances. The correction method is not particularly limited, but to reduce the data processing load, for example, a simple method may be used, such as adjusting the expected time of arrival (C1) by 1% when the distance between the sub-terminal 300 and focus is shorter than the distance between the earthquake announcement server 100 and the focus by 1%.

Since an accurate method is used for the point where the earthquake announcement server 100 is installed, and the correction is limited to the surrounding points, this does not have much adverse effect. The program can calculate a numerical value close to the exact value, without increasing the data processing load of the earthquake announcement server 100. On the other hand, regarding the estimated seismic intensity (C2), if there is no suitable method with a simple correction, the existing value may be used without modification. The sub-terminal 300 may display the corrected expected arrival data (H) on the display unit as it is. The sub-terminal 300, by installing the same time remaining/estimated seismic intensity display program 2001 as for the earthquake announcement terminal 200 described previously, may also display the time remaining on the display unit by countdown. The flow which corrects the earthquake expected arrival data at the point where the earthquake announcement server 100 is installed, is the same as that of S21-S25 of the flow chart of FIG. 11.

Figure 15:
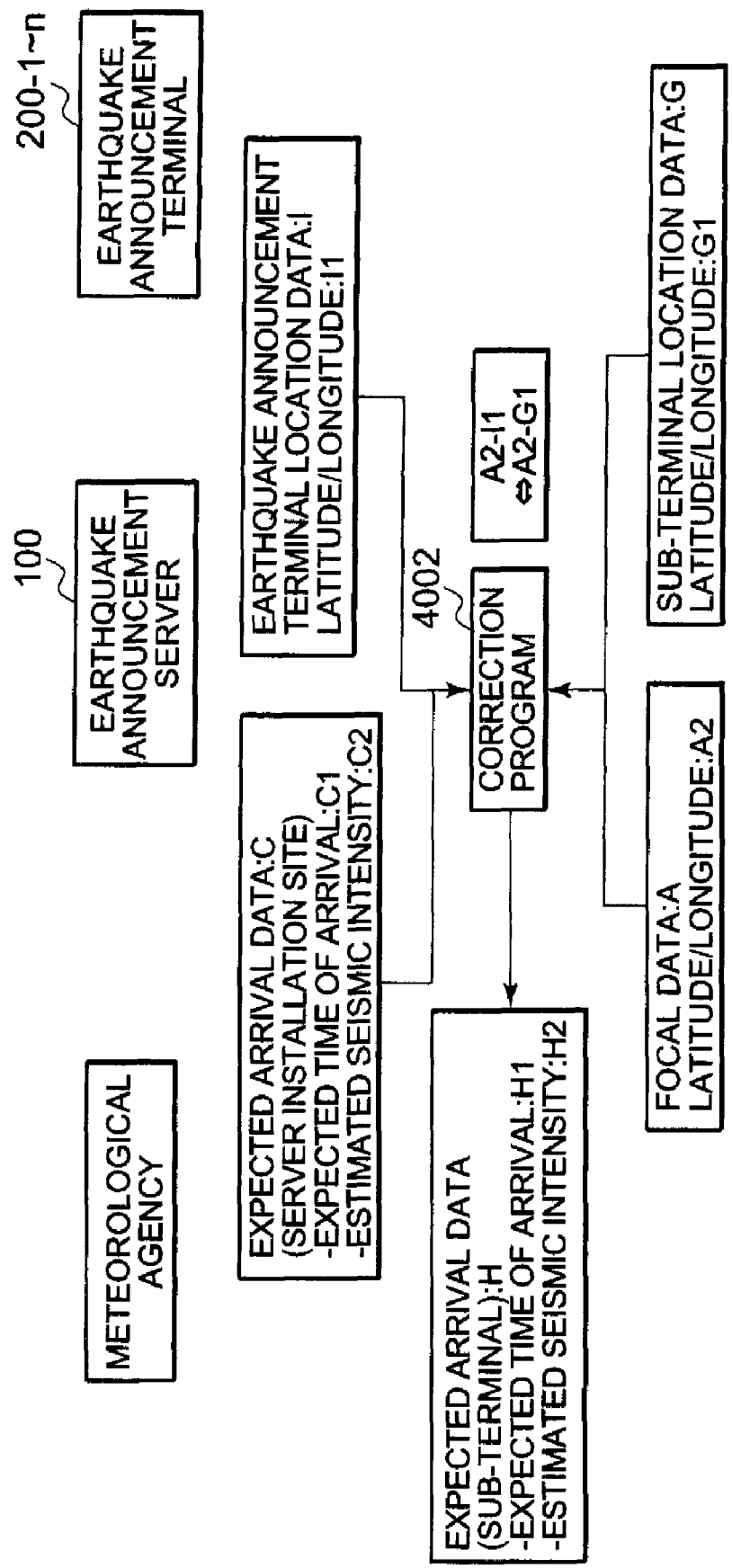
FIG. 15 is a diagram showing transmission of the earthquake expected arrival data to the sub-terminal in the area surrounding the earthquake announcement terminal according to this embodiment.
Figure 16:
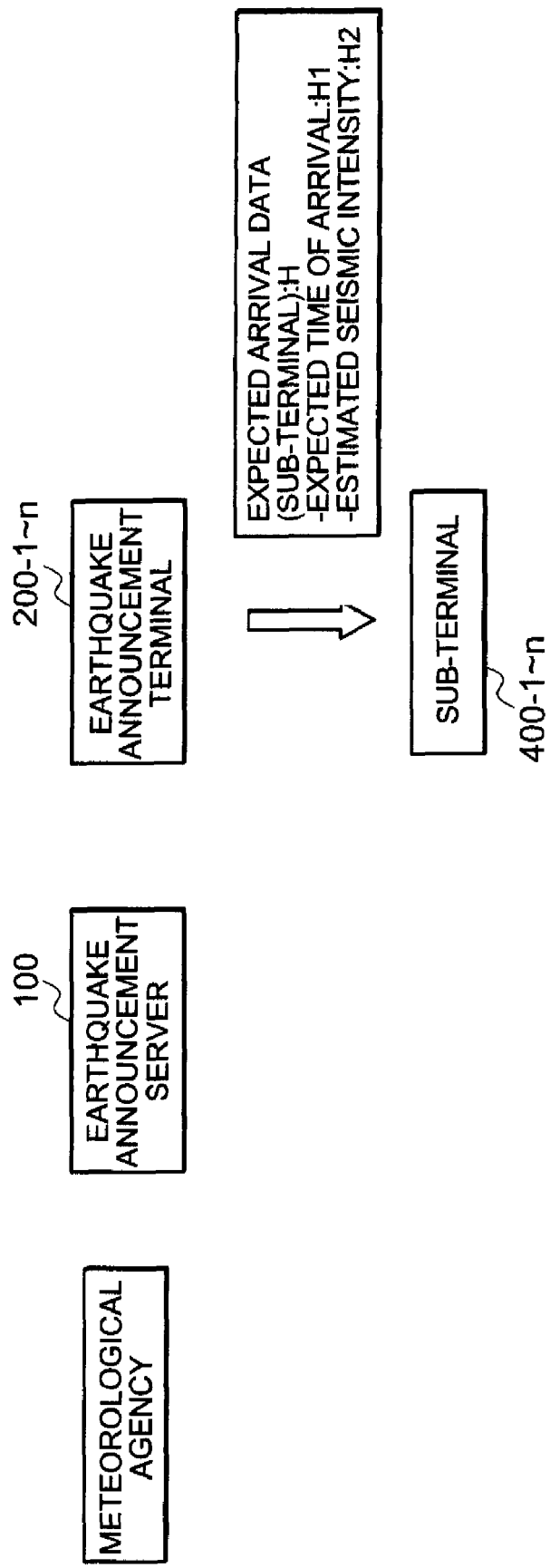
FIG. 16 is a diagram showing the corrected earthquake prediction data transmitted to a sub-terminal according to this embodiment.

FIGS. 15-16 show a pattern whereby the earthquake announcement terminal 200 transmits the corrected data to the sub-terminal 400 installed in the area surrounding the earthquake announcement terminal 200. Specifically, the earthquake announcement terminal 200 calculates corrected data which corrects the earthquake expected arrival data at the point where the earthquake announcement terminal 200 is installed. The FIG. 2 shows the constitution of the earthquake announcement terminal 200. The earthquake announcement terminal 200 receives the earthquake expected arrival data (C) at the point where the earthquake announcement terminal 200 is installed. Then, as shown in FIG. 15, the earthquake announcement terminal 200 starts the correction program 4002, and generates the expected arrival data (H) for the sub-terminal 400 which corrects the expected arrival data (C) at the point where the earthquake announcement terminal 200 is installed. First, the program reads earthquake announcement terminal location data (I) for the point where the earthquake announcement terminal 200 was installed, and the sub-terminal location data (G) for a certain point at which the sub-terminal 400 was installed, from the sub-terminal location data storage unit 4001. The sub-terminal location data includes the latitude and longitude of the point where the sub-terminal 400 was installed. The program calculates the distance between the earthquake announcement terminal 200 and the focus from the earthquake announcement terminal location data (F). The program also calculates the distance between the sub-terminal 400 and the focus from the read sub-terminal location data (G) and the focal latitude/longitude (part of A2) included in the focal data. Regarding the earthquake announcement terminal location data (I) for the point where the earthquake announcement terminal 200 is installed, the earthquake announcement terminal location data (I) used for calculation in the earthquake announcement server 100 may be received from the earthquake announcement server 100, or the data stored in the earthquake announcement terminal 200 may be read. The program corrects the expected time of arrival (C1) using the ratio of these distances. The correction method is not particularly limited, but in order to reduce the data processing load, it is preferred to use a simple method, such as to adjust the expected time of arrival (C1) by 1%, for example, if the distance between the sub-terminal 400 and the focus is shorter than the distance between the earthquake announcement terminal 200 and the focus by 1%. Since a detailed calculation is performed for the point where the earthquake announcement server 200 is installed and the correction is limited to the surrounding points, this does not have much adverse effect. The sub-terminal 400 can calculate a numerical value close to the correct value without increasing the data processing load of the earthquake announcement server 100 or earthquake announcement terminal 200 excessively. On the other hand, regarding the estimated seismic intensity (C2), if there is no suitable method with a simple correction, the existing value may be used without modification. The flow which corrects the earthquake expected arrival data at the point where the earthquake announcement terminal 200 is installed, is the same as that of S21-S25 of the flowchart of FIG. 11 (the server location is replaced to the earthquake announcement terminal location). The earthquake announcement terminal 200 transmits the corrected expected arrival data (H) to the sub-terminal 400, as shown in FIG. 16. The sub-terminal 400 may display the expected arrival data (H) as it is, or the time remaining may be displayed on the display by count down by installing the same time remaining/estimated seismic intensity displayed program 2001 as that of the earthquake announcement terminal 200 described above, in the sub-terminal 400.

Figure 17:
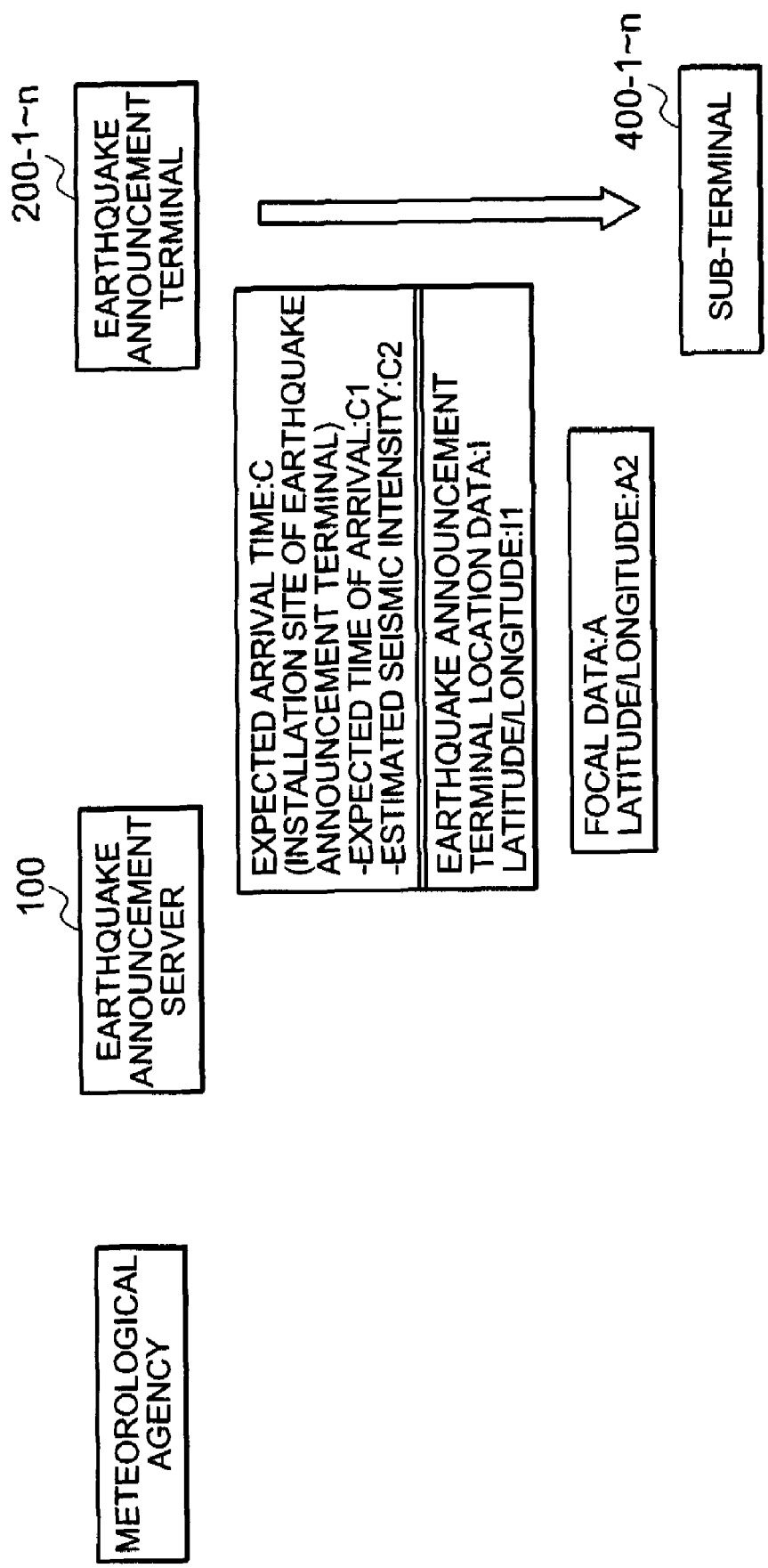
FIG. 17 is a diagram showing the corrected earthquake prediction data transmitted to the sub-terminal according to this embodiment.
Figure 18:
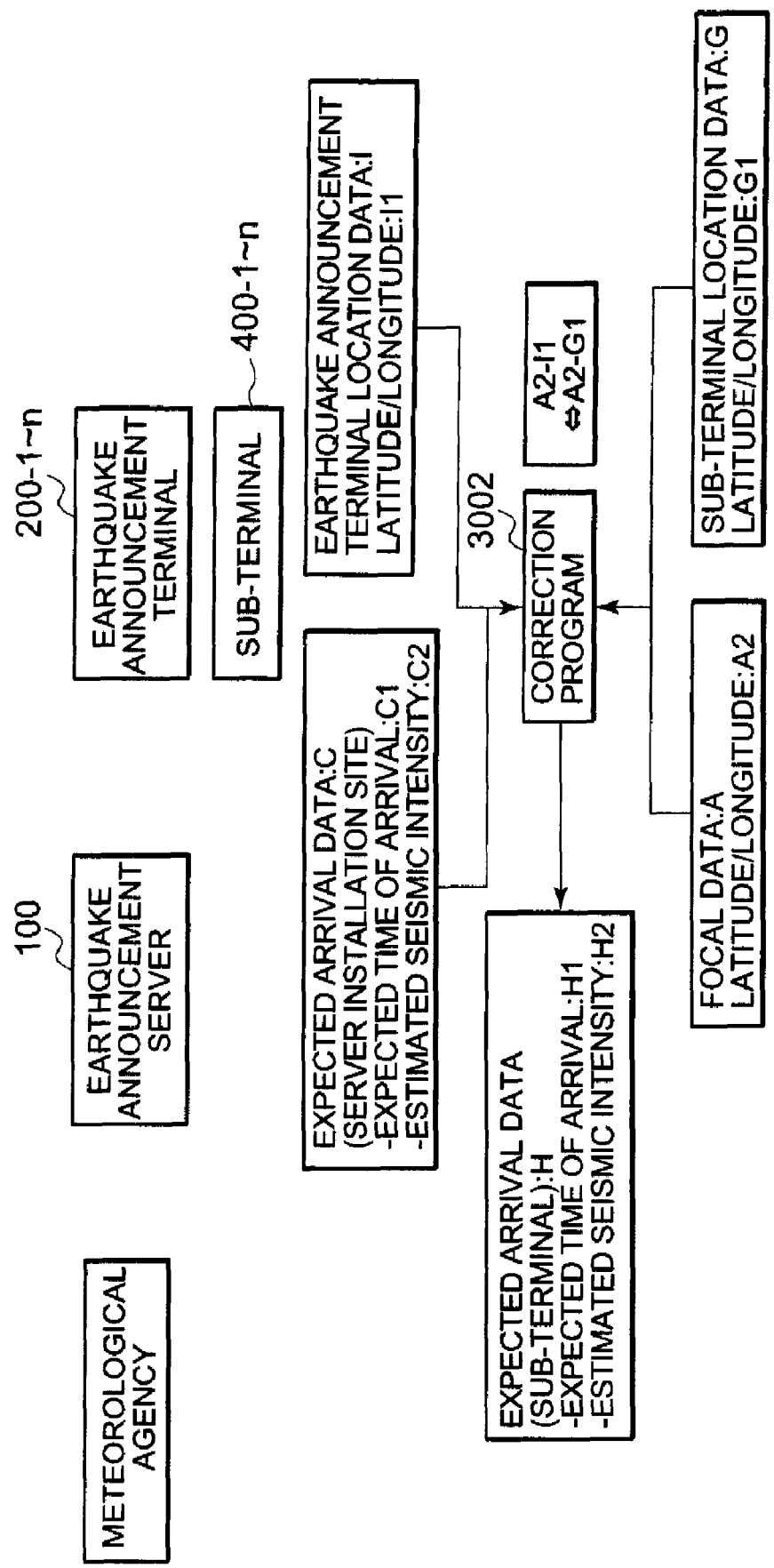
FIG. 18 is a diagram showing transmission of the earthquake expected arrival data to a sub-terminal in the area surrounding the earthquake announcement terminal according to this embodiment, and the corrected earthquake prediction data at the sub-terminal.
Figure 19:
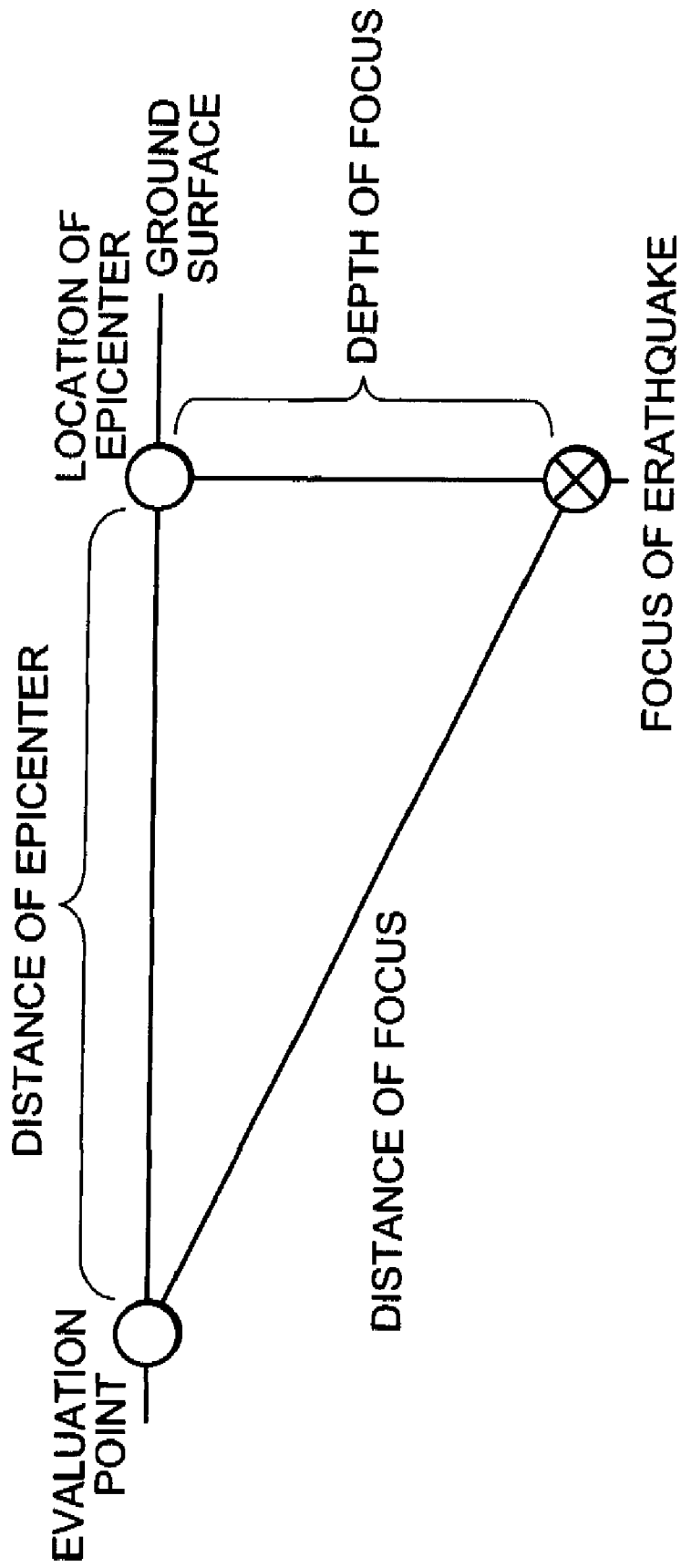
FIG. 19 is a diagram describing a measurement of the arrival of an earthquake tremor.

FIGS. 17-18 show a pattern whereby the earthquake prediction information corrected by the sub-terminal 300 is generated.

Specifically, the earthquake announcement server 200 transmits the earthquake expected arrival data for the point where the earthquake announcement server 200 is installed, to the sub-terminal 300 installed in the area surrounding the earthquake announcement server 200. The earthquake announcement terminal 200 and sub-terminal 300 are constituted as shown in FIG. 3.

As shown in FIG. 17, the earthquake announcement terminal 200 transmits the earthquake expected arrival data (C) for the point where the earthquake announcement terminal 200 is installed, the earthquake announcement terminal location data (I) for the point where the earthquake announcement server 200 is installed, and the focal latitude/longitude (part of A2) included in the focal data, to the sub-terminal 300. Regarding the earthquake announcement terminal location data (I), the earthquake announcement terminal location data (G) used for calculation in the earthquake announcement server 100 may be received from the earthquake announcement server 100, or the data stored in the earthquake announcement terminal 200 may be read. Or, if it is stored by the sub-terminal 300, the earthquake announcement terminal location data (G) need not be transmitted here. The sub-terminal 300 receives these data, and as shown in FIG. 18, it starts the correction program 3002. The program corrects the expected arrival data (C) for the point where the earthquake announcement server 100 is installed, and generates the expected arrival data (H) in the sub-terminal 300. First, the program reads the sub-terminal location data (G) for the point where the sub-terminal 300 is installed from the sub-terminal location data storage unit 3001. The sub-terminal location data includes the latitude and longitude of the point where the sub-terminal 300 is installed. The program calculates the distance between the earthquake announcement terminal 200 and the focus from the earthquake announcement terminal location data (F) received from the earthquake announcement terminal 200, and the focal latitude/longitude (part of A2) included in the focal data.

The program also calculates the distance between the sub-terminal 300 and the focus from the read sub-terminal location data (G), and the focal latitude and longitude (part of A2) included in the focal data. The program corrects the expected time of arrival (C1) using the ratio of these distances. The correction method is not particularly limited, but to reduce the data processing load, for example, a simple method may be used, such as adjusting the expected time of arrival (C1) by 1% when the distance between the sub-terminal 300 and the focus is shorter than the distance between the earthquake announcement server 200 and the focus by 1%. Since a detailed calculation is performed for the point where the earthquake announcement server 200 is installed and the correction is limited to the surrounding points, this does not have much adverse effect. The sub-terminal 300 can calculate a numerical value close to the correct value without increasing the data processing load of the earthquake announcement server 100 or the earthquake announcement terminal 200. On the other hand, regarding the estimated seismic intensity (C2), if there is no suitable method with a simple correction, the existing value may be used without modification. The corrected expected arrival data (H) may be displayed on the display unit as it is, or, by installing the same time remaining/expected seismic intensity display program 2001 as for the earthquake announcement terminal 200 described previously, the time remaining may also be displayed on the display unit by countdown. The flow which corrects the earthquake expected arrival data at the point where the earthquake announcement terminal 200 is installed, is the same as that of S21-S25 of the flowchart of FIG. 11 (the server location is replaced by the earthquake announcement terminal location).

According to this aspect, detailed earthquake prediction information may be provided to many points without increasing the calculation load of the earthquake announcement server 100 or earthquake announcement terminal 200 excessively. This effect is due to by the following composition. Specifically, data which was corrected by a simple method, is transmitted to the sub-terminal 300 (400) in the surrounding region which performed a detailed calculation. Also, even if a communication delay arises, the terminal can display the time remaining to arrival of the earthquake based on the expected time of arrival of the earthquake calculated by the server. This effect is due to the following composition. Specifically, the server does not transmit the time remaining calculated by the server to the terminal. Instead, the server transmits the expected time of arrival to the terminal, and the terminal calculates the time remaining.

Also, even if the time currently measured by the terminal is inaccurate, the time remaining can be calculated accurately. This effect is due to the following composition. Specifically, the server transmits the announcement time of the data with the expected time of arrival from the server, the terminal compares this announcement time with the time provided to the terminal, and if there is an offset, the terminal uses the announcement time.

The above embodiments are preferred examples of the invention, but various modifications thereof may be made to the extent that they do not depart from the scope and spirit of the invention. For example, each apparatus can read a program of each apparatus and execute the program in itself. This program may further be forwarded to another computer system via a CD-ROM or magneto-optic disc which is a computer-readable medium, via the Internet which is a forwarding medium, or via a telephone line.

While this invention has been described in conjunction with the preferred embodiments described above, it will now be possible for those skilled in the art to put this invention into practice in various other manners.

What is claimed is:

1. A server for calculating expected seismic data comprising:
   a receiving unit receiving focal data including an occurrence time and an occurrence location and a focal depth, and a seismic magnitude;
   a storing unit storing a data regarding the location of said server and the location of at least one sub-terminal;
   a first calculating unit calculating a distance from said occurrence location to location of said server, and calculating an expected time of arrival of an earthquake at said sub-terminal based on said distance and said focal depth;
   an estimating unit estimating a seismic intensity based on said occurrence location, said location of said server and said seismic magnitude;
   a second calculating unit calculating a time offset for said expected time of arrival based on said occurrence location, said location of said server and said location of said sub-terminal; and
   a transmitting unit transmitting said time offset and said estimated seismic intensity to said sub-terminal.

2. A server for calculating an expected seismic data, comprising:
   receiving unit receiving focal data including an occurrence time and an occurrence location and a focal depth, and a seismic magnitude;
   storing unit storing a data regarding the location of said server and the location of at least one sub-terminal;
   calculating unit calculating a distance from said occurrence location to said location of said server and calculating an expected time of arrival of an earthquake at said sub-terminal based on said distance and said focal depth;
   estimating unit estimating a seismic intensity based on said occurrence location, said location of said server and said seismic magnitude; and
   transmitting unit transmitting said expected time and said estimated seismic intensity, said occurrence location and said location of said server to said sub-terminal;
   wherein, said sub-terminal calculates a time offset of said expected time based on said occurrence location, said location of said server and a location of said sub-terminal.

3. A system for providing a notice of an earthquake, comprising:
   a server calculating an expected seismic data;
   at least one terminal receiving said expected data from said server,
   wherein said server receives a focal data including an occurrence time and an occurrence location and a focal depth, and a seismic magnitude, and stores a location of said terminal and calculates a distance from said occurrence location to the location of said terminal, and calculates an expected time of arrival of said earthquake at said terminal based on said distance and said focal depth,
   wherein said terminal calculates a time of remaining based on a difference between said expected time and a current time of said terminal, and displays said time of remaining and said estimated seismic intensity, wherein said terminal stores a location of at least one sub-terminal, and wherein said terminal calculates a time offset based on said occurrence location and said location of said terminal and said location of said sub-terminal, and transmits said time offset and said estimated seismic intensity to said sub-terminal.

4. The system according to claim 3, wherein said seismic data includes an announcement time when said earthquake is announced, wherein said server transmits said announcement time to said terminal, wherein said terminal calculates a time of remaining based on a difference between said expected time and said announcement time if the difference between said announcement time and the current time of said terminal exceeds a threshold, wherein said terminal calculates a time of remaining based on a difference between said expected time and said current time of said terminal if a difference between said announcement time and the current time of said terminal does not exceed said threshold, and wherein said terminal displays said time of remaining.

5. A system for providing a notice of an earthquake comprising:

a server calculating an expected seismic data;

at least one terminal receiving said expected data from said server;

at least one sub-terminal surrounding said terminal, wherein said server receives a focal data including an occurrence time, an occurrence location, a focal depth and a seismic magnitude, and stores a location of said terminal, and calculates a distance from said occurrence location to said location of said terminal, and calculates an expected time of arrival of said earthquake at said terminal based on said distance and said focal depth, and estimates a seismic intensity based on said occurrence location and said location of said terminal and said seismic magnitude, and transmits the expected time and the estimated seismic intensity and said occurrence location to said terminal, wherein said terminal calculates a time of remaining based on a difference between said expected time and a current time of said terminal, and displays said time of remaining and said estimated seismic intensity, wherein said terminal transmits said expected time, and said estimated seismic intensity and said occurrence location and said location of said terminal to said sub-terminal, and wherein said sub-terminal calculates a time offset of said expected time based on said occurrence location, said location of said terminal, and a location of said sub-terminal.

6. The system according to claim 4, wherein said sub-terminal calculates a time offset of said expected time.

7. A method for providing a notice of an earthquake from a server to at least one sub-terminal, comprising:

receiving focal data including an occurrence time, an occurrence location, a focal depth and a seismic magnitude;

storing a location of said server and the location of at least one sub-terminal and calculating a distance from said occurrence location to said location of said server;

calculating an expected time of arrival of said earthquake at said sub-terminal based on said distance and said focal depth;

estimating a seismic intensity based on said occurrence location, said location of said server and said seismic magnitude;

calculating a time offset of said expected time based on said occurrence location, said location of said server and said location of said sub-terminal; and transmitting said time offset and said estimated seismic intensity to said sub-terminal.

8. A method for providing a notice of an earthquake from a server to at least one sub-terminal, comprising:

in said server, receiving a focal data including an occurrence time, an occurrence location, a focal depth and a seismic magnitude;

storing a location of said server and a location of at least one sub-terminal, calculating a distance from said occurrence location to said location of said server;

calculating an expected time of arrival of an earthquake at said sub-terminal based on said distance and said focal depth;

estimating a seismic intensity based on said occurrence location, said location of said server and said seismic magnitude;

transmitting said expected time, said estimated seismic intensity, said occurrence location and said location of the server to said sub-terminal; and wherein said sub-terminal calculates a time offset of said expected time based on said occurrence location, said location of the server and a location of said sub-terminal.

9. A method for providing a notice of an earthquake from a server to at least one terminal comprising:

in said server, receiving a focal data including an occurrence time, an occurrence location, a focal depth and a seismic magnitude;

storing a location of said terminal;

calculating a distance from said occurrence location to said location of terminal;

calculating an expected time of arrival of said earthquake at said terminal based on said distance and said focal depth;

estimating a seismic intensity based on said occurrence location and said location of terminal and said seismic magnitude;

transmitting said expected time and said estimated seismic intensity and said occurrence location to said terminal;

in said terminal, calculating a time of remaining based on a difference between said expected time and a current time of said terminal;

displaying said time of remaining;

displaying said estimated seismic intensity;

storing a location of at least one sub-terminal, calculating a time offset based on said occurrence location and said location of terminal and said location of sub-terminal; and transmitting said time offset and said estimated seismic intensity to said sub-terminal.

10. The method according to claim 9, wherein said seismic data includes an announcement time when said earthquake is announced;

in said server, further comprising:

transmitting said announcement time to said terminal;

in said terminal, further comprising:
calculating a time of remaining based on a difference between said expected time and said announcement time if a difference between said announcement time and the current time of said terminal exceeds a threshold;
calculating a time of remaining based on a difference between said expected time and said current time of said terminal if a difference between said announcement time and the current time of said terminal does not exceed said threshold; and
displaying said time of remaining.

11. A method for providing a notice of an earthquake from a server to at least one terminal comprising:
in a server,
receiving a focal data including an occurrence time, an occurrence location, a focal depth, and a seismic magnitude;
storing a location of said terminal and calculates a distance from said occurrence location to said location of said terminal;
calculating an expected time of arrival of said earthquake at said terminal based on said distance and said focal depth;
estimating a seismic intensity based on said occurrence location and said location of said terminal and said seismic magnitude;
transmitting said expected time and said estimated seismic intensity and said occurrence location to said terminal;
in at least one terminal,
calculating a time of remaining based on a difference between said expected time and current time of said terminal;
displaying said time of remaining;
displaying said estimated seismic intensity;
transmitting said expected time and said estimated seismic intensity, said occurrence location, and said location of said terminal to said sub-terminal; and
in at least one sub-terminal, calculating a time offset of said expected time based on said occurrence location and said location of terminal and a location of said sub-terminal.

12. The method according to claim 10, further comprising:
in said sub-terminal, calculating a time offset of said expected time.

13. A computer readable medium embodying a program, said program causing a terminal to perform a method, said method comprising:
receiving focal data including an occurrence time, an occurrence location, a focal depth, and a seismic magnitude;
storing a self-location of a server and at least one location of a sub-terminal surrounding said server and calculating a distance from said occurrence location to said location of said server;
calculating an expected time of arrival of said earthquake at said sub-terminal based on said distance and said focal depth;
estimating a seismic intensity based on said occurrence location, said location of said server and said seismic magnitude;
calculating a time offset of said expected time based on said occurrence location, said location of said server and said location of said sub-terminal, and
transmitting said time offset and said estimated seismic intensity to said sub-terminal.

14. A computer readable medium embodying a program, said program causing a terminal to perform a method, said method comprising:
receiving a focal data including an occurrence time, an occurrence location, a focal depth and a seismic magnitude;
storing a location of a server and a location of at least one sub-terminal surrounding said server;
calculating a distance from said occurrence location to said location of said server;
calculating an expected time of arrival of an earthquake at said sub-terminal based on said distance and said focal depth;
estimating a seismic intensity based on said occurrence location, said location of said server and said seismic magnitude;
transmitting said expected time, said estimated seismic intensity, said occurrence location and said location of said server to said sub-terminal; and
wherein said sub-terminal calculates a time offset of said expected time based on said occurrence location, said location of said server and a location of said sub-terminal.

* * * * *